Inventors
HARLAN L. BAUMBACH
ARTHUR L. FORD
WALTER ENKELMANN
BY
Attorney

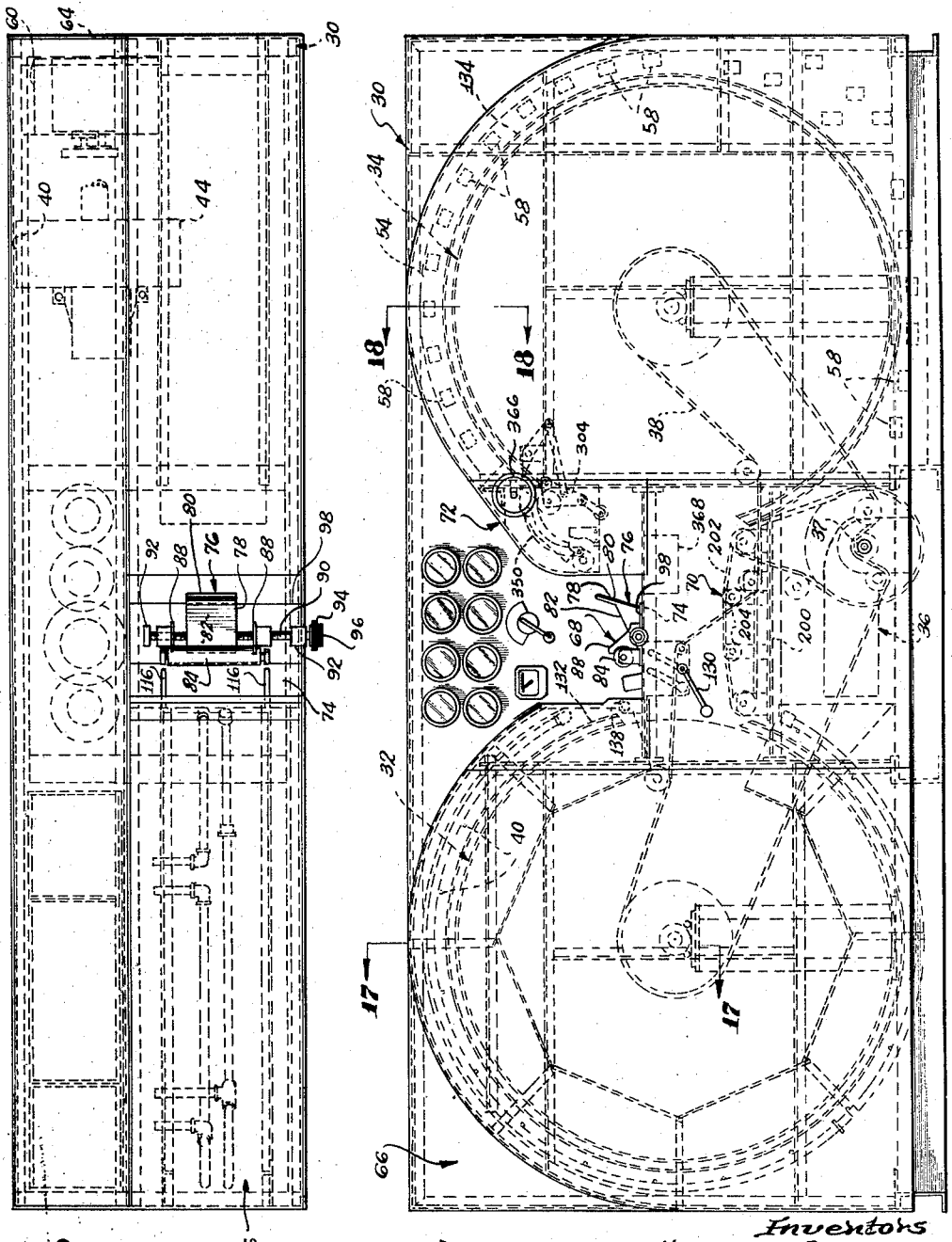

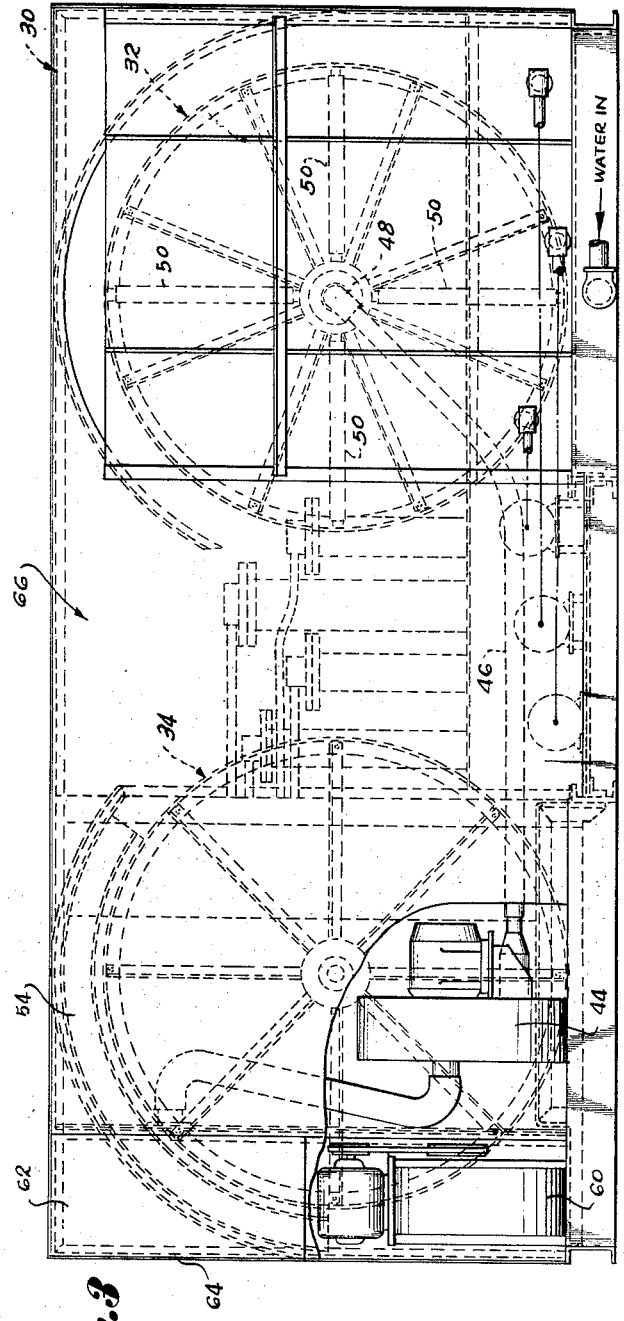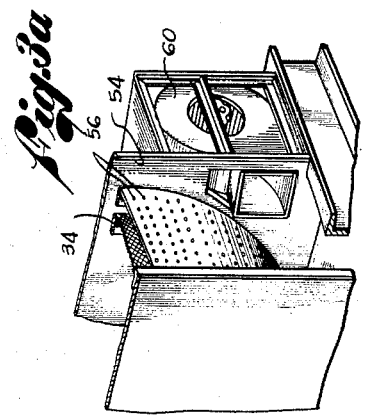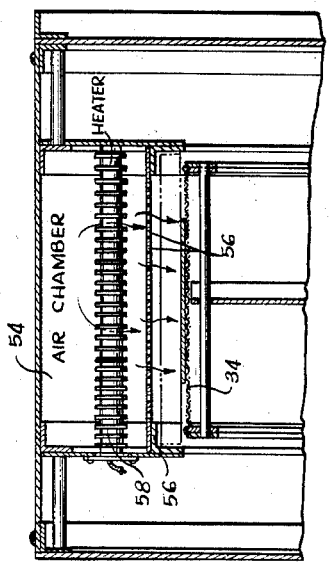

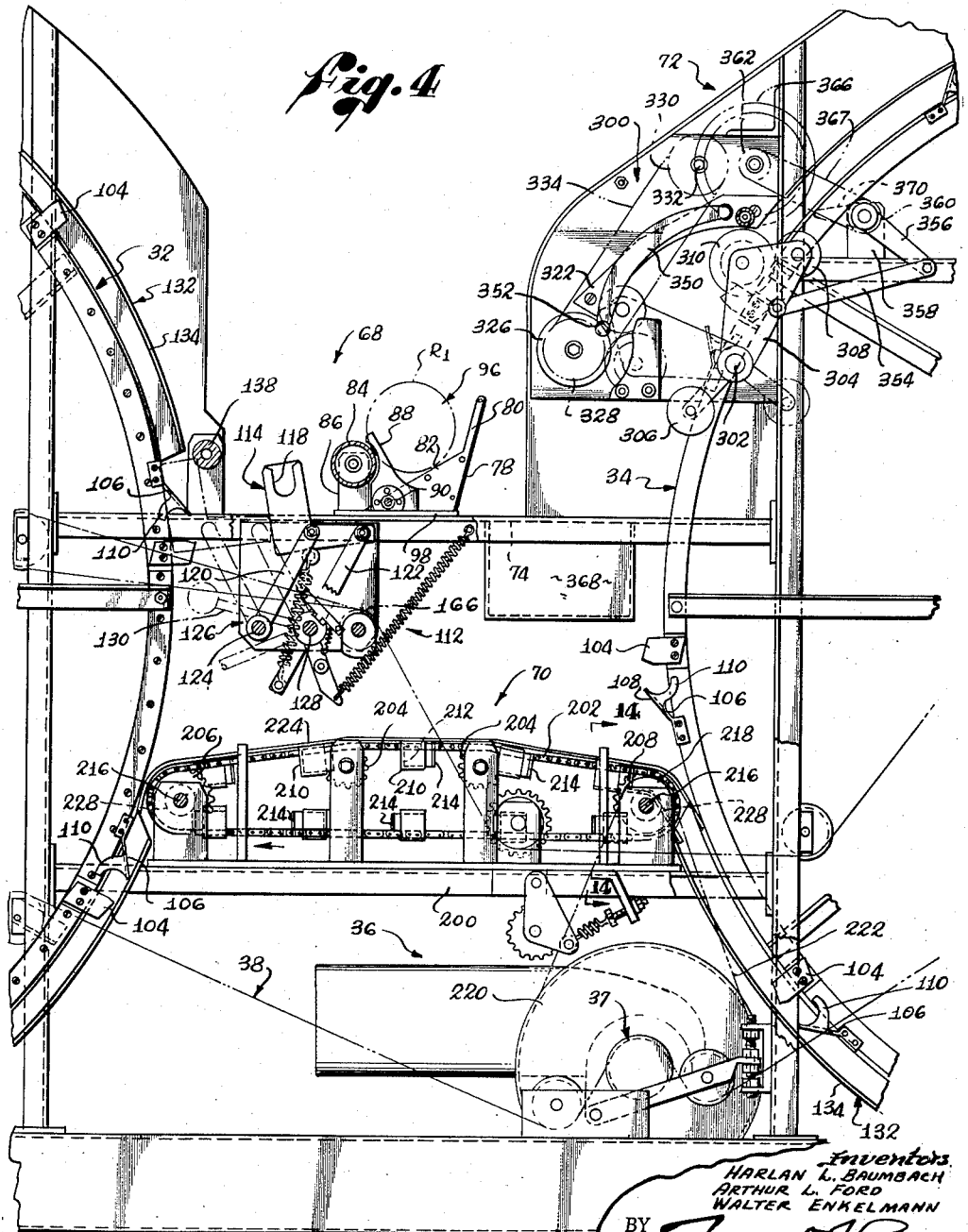

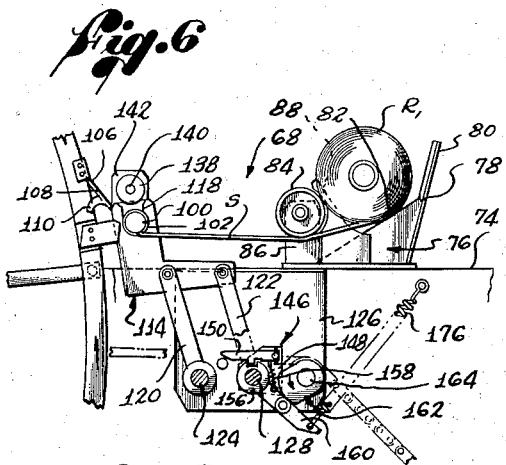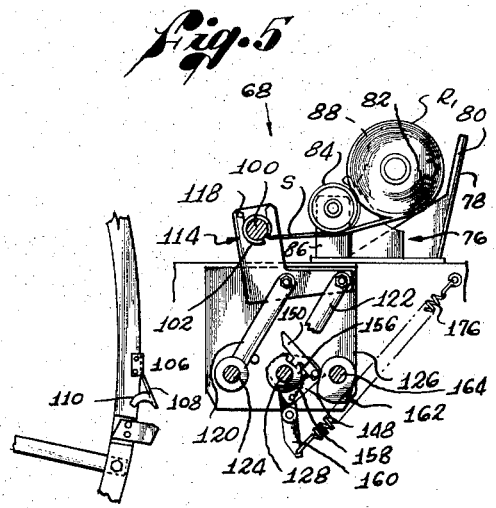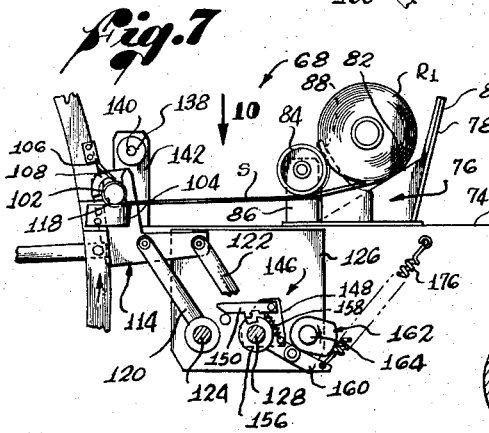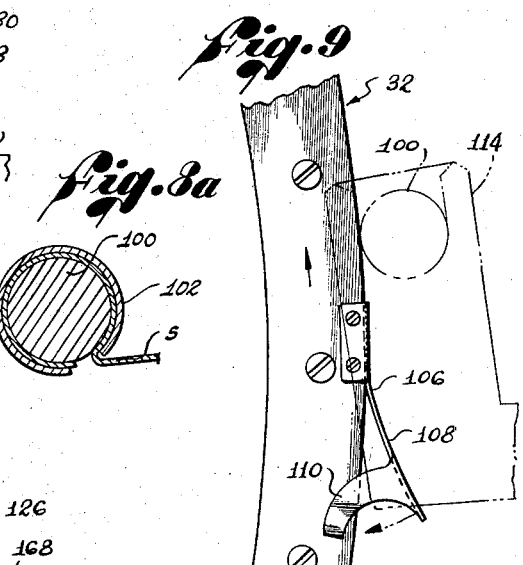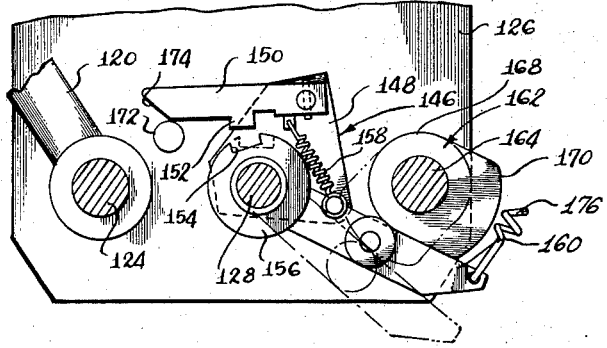

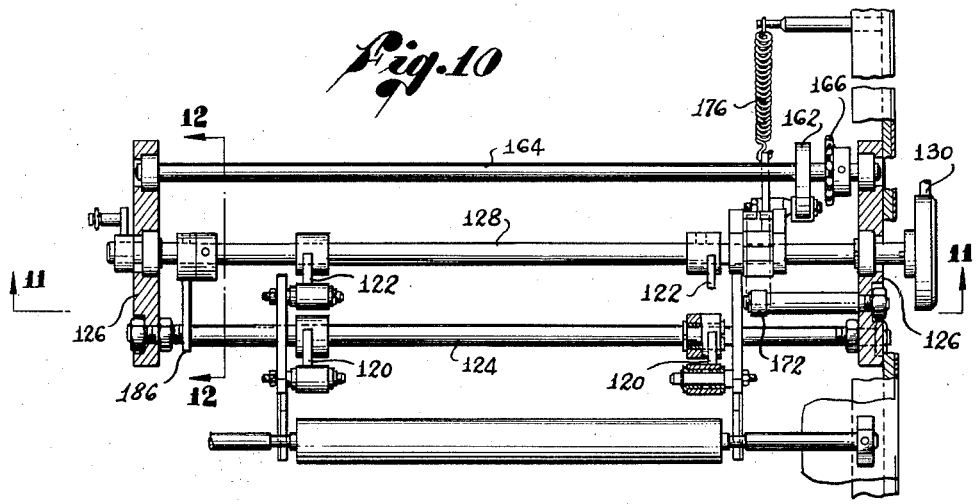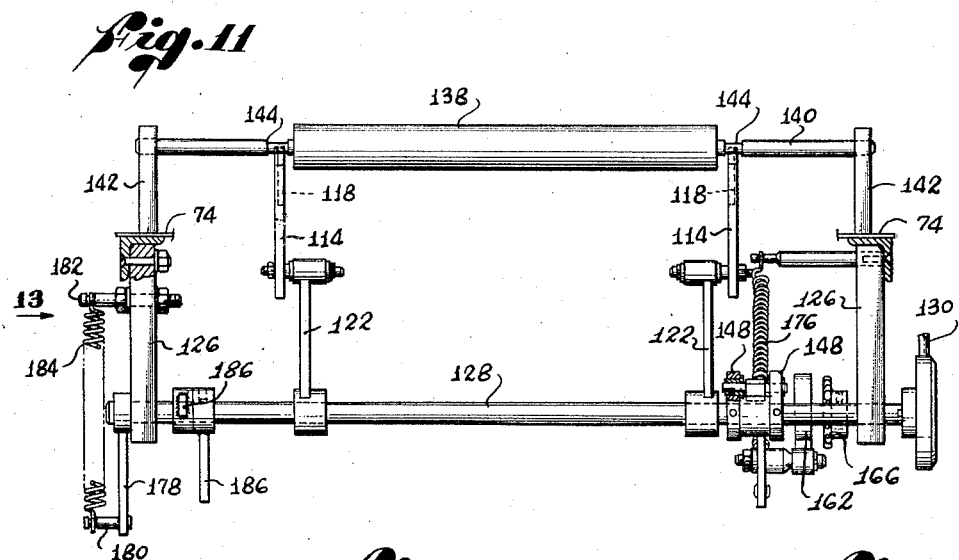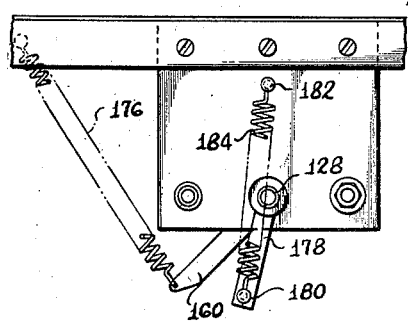

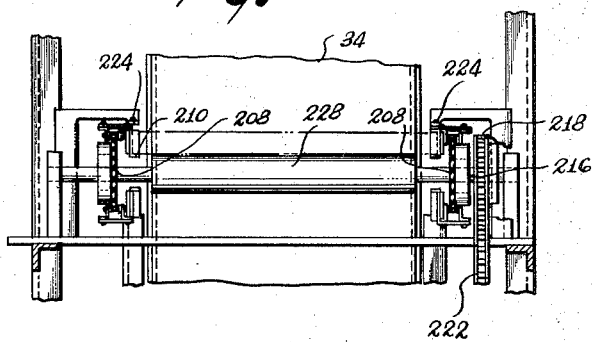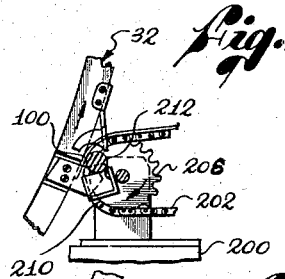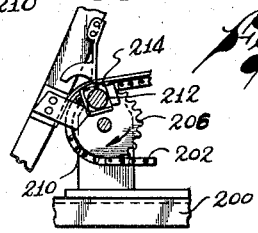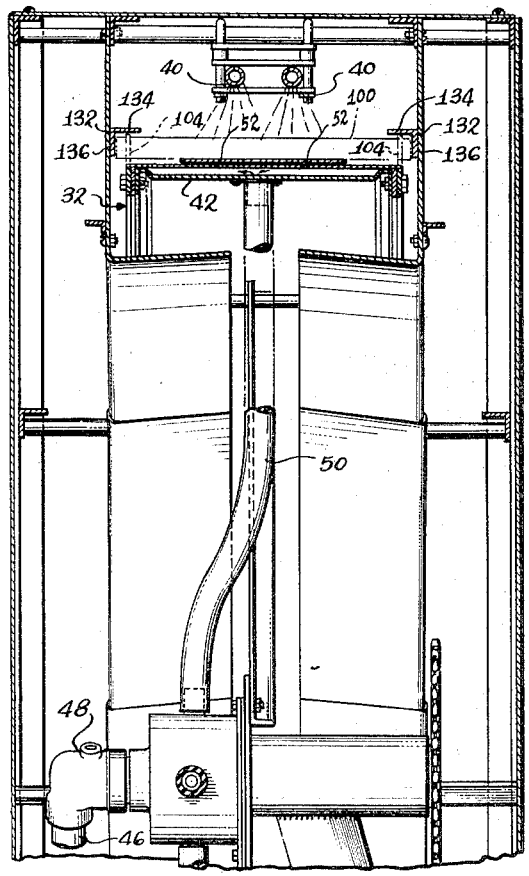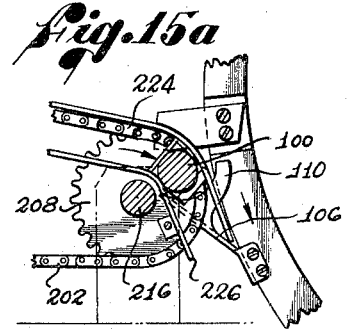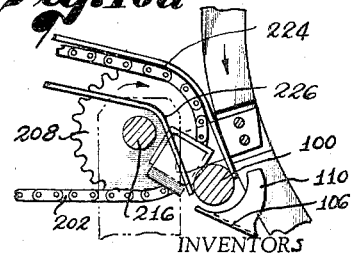

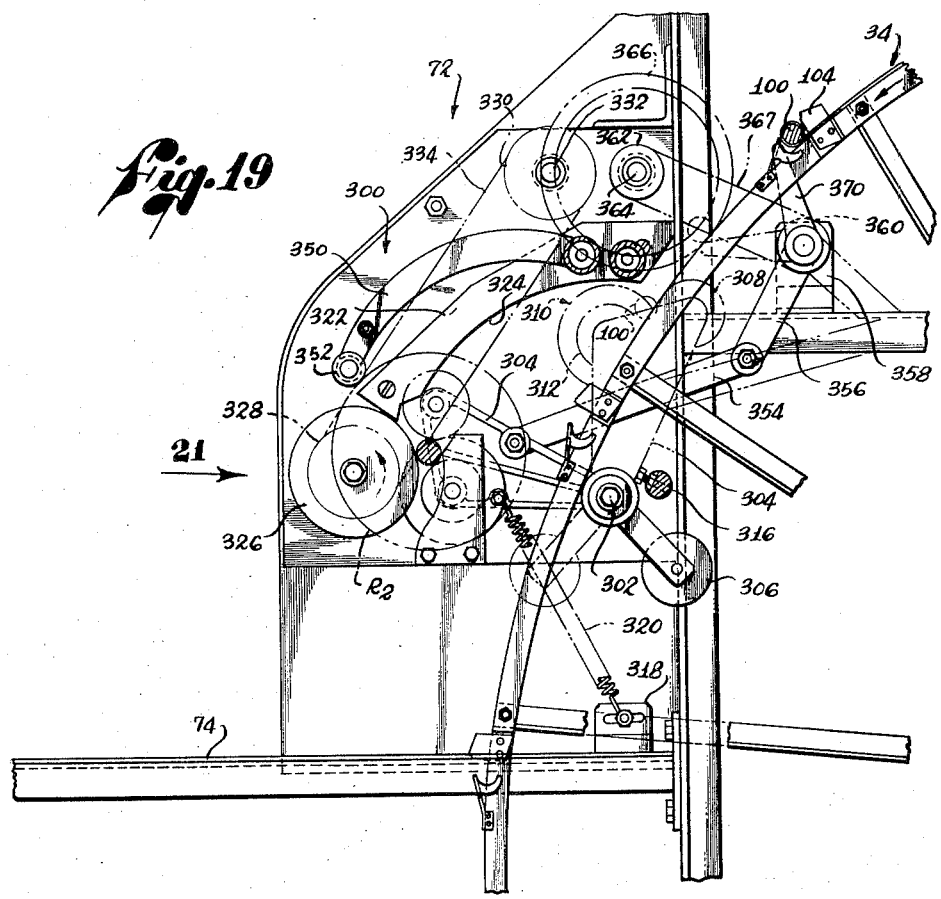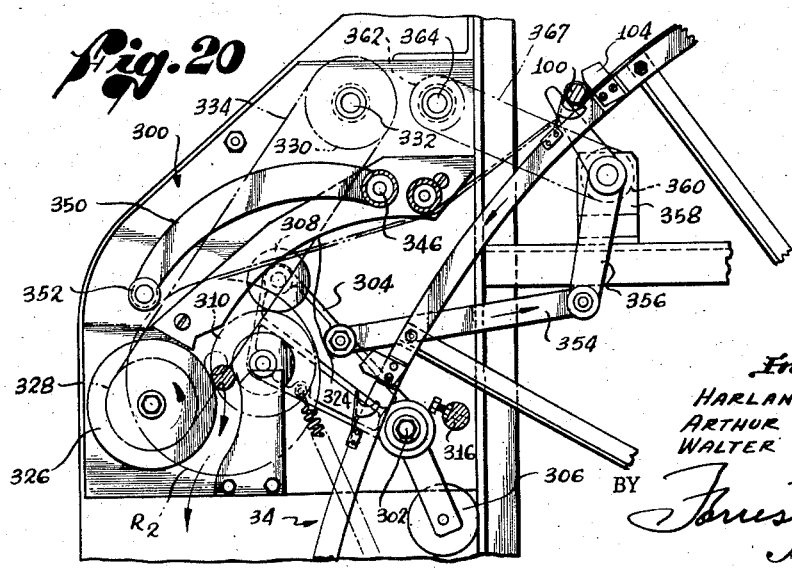

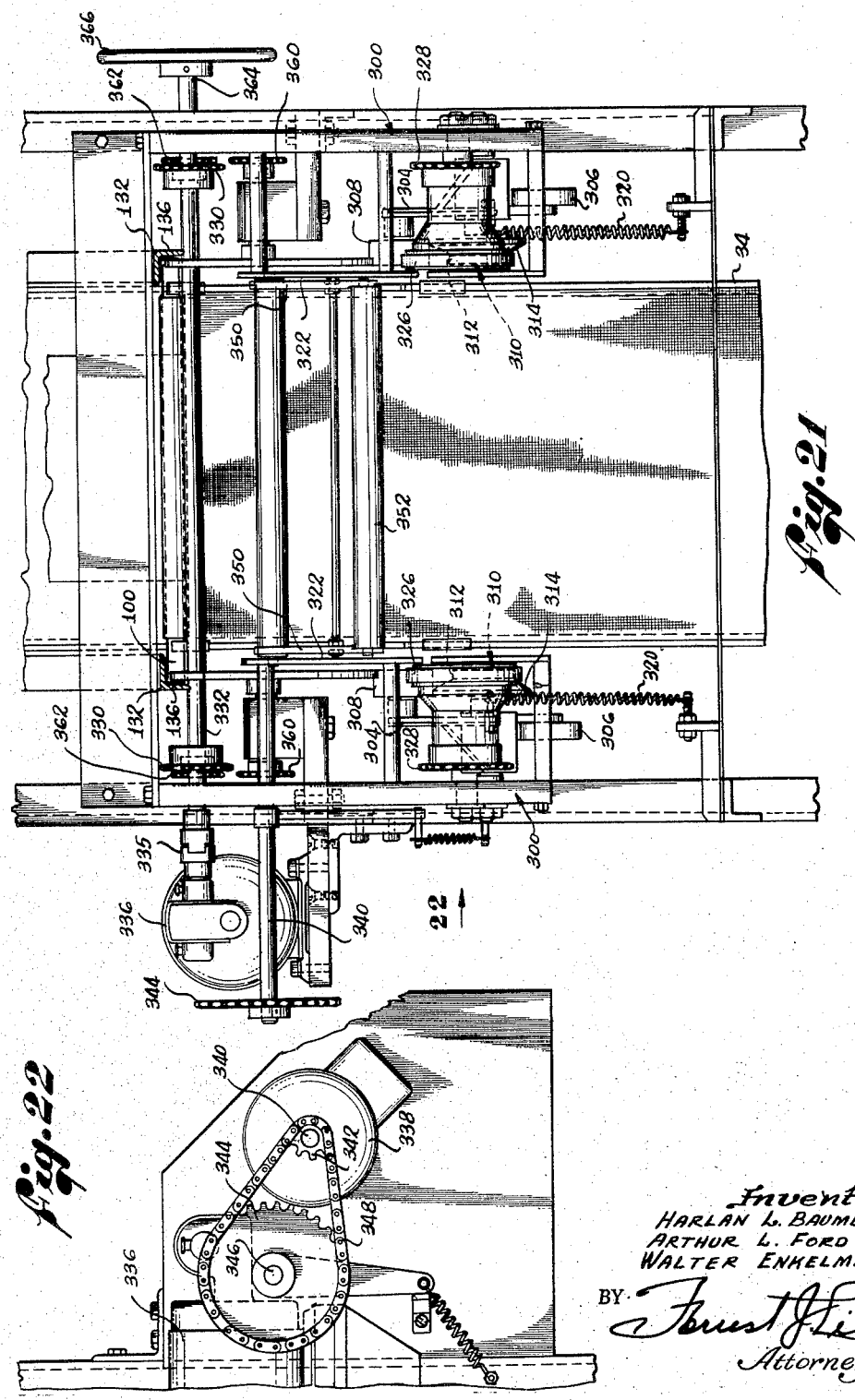

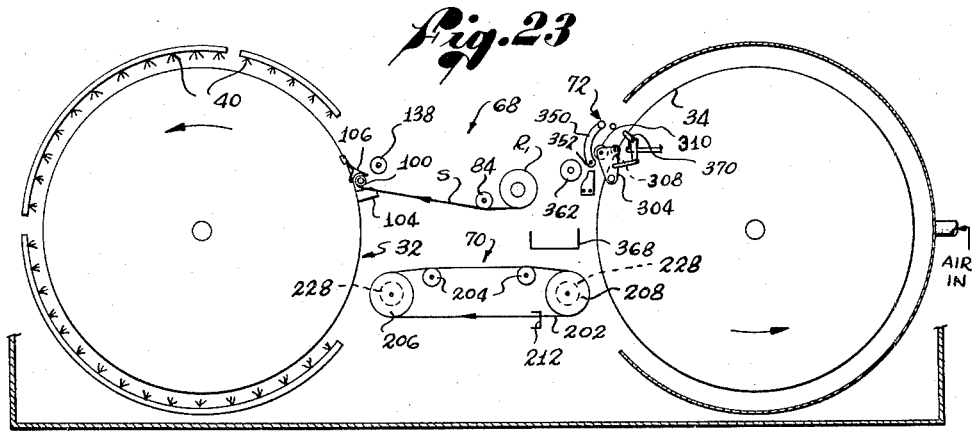
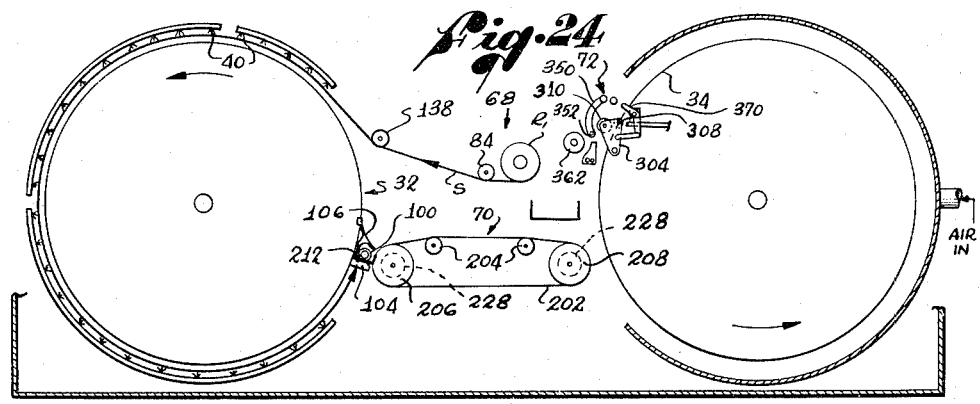
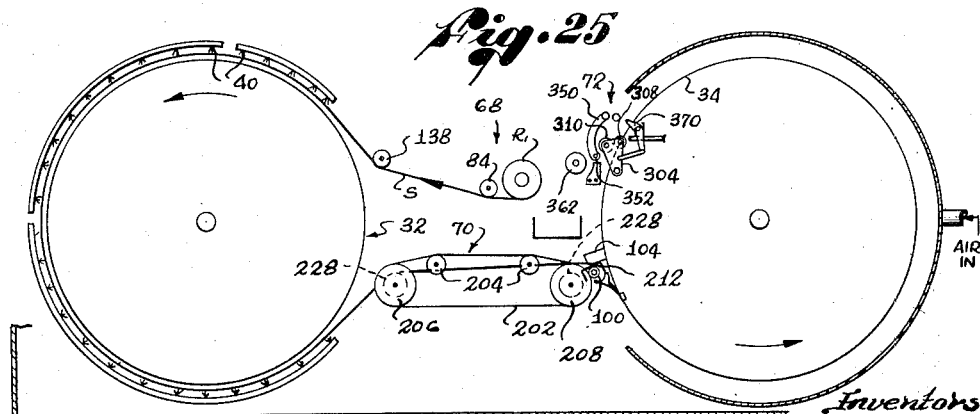

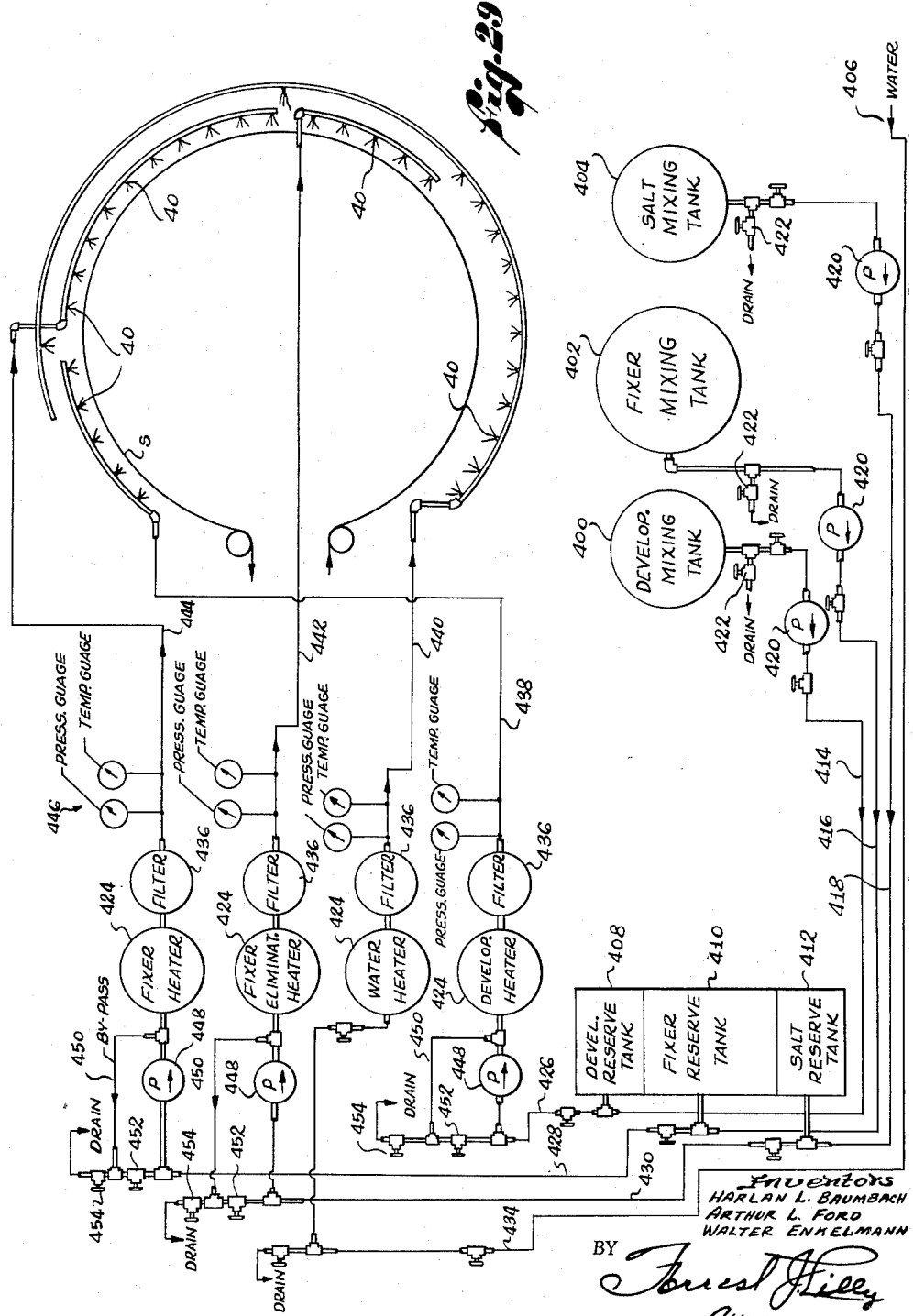

United States Patent Office

2,951,651
Patented Sept. 6, 1960

2,951,651

CORE TYPE HANDLING MECHANISM FOR PHOTOGRAPHIC PROCESSING MACHINE

Walter Enkelmann, Ihringshausen, near Kassel, Germany, and Harlan L. Baumbach, Los Angeles, and Arthur L. Ford, Granada Hills, Calif., assignors to Unicorn Engineering Corporation, Hollywood, Calif., a corporation of California Filed Dec. 23, 1957, Ser. No. 704,504

25 Claims. (Cl. 242—55)

This invention relates generally to material handling apparatus, and more particularly to apparatus for handling long strips of flexible material.

One illustrative application of the present apparatus is that of handling long strips of exposed, sensitized paper such as oscillograph records during processing. Co-pending patent application, Serial No. 627,302, filed December 10, 1956, now Patent No. 2,861,508 and entitled Processing Machine for Sensitized Paper and the Like discloses a photographic processing machine for treating long strips of photographic material. Briefly, one form of this latter machine comprises a pair of rotary drums about which the strip of photographic material to be treated is fed. Arranged about the periphery of one of these drums are a series of nozzles for directing sprays of photographic processing solutions toward the drum. Arranged about the other drum is a curved impingement dryer for directing jets of warm air against the adjacent drum.

During operation of this machine, a strip of exposed, sensitized photographic material, such as an oscillograph record, is first passed around the wet drum so that each portion of the strip moves successively through the sprays which issue from the nozzles arranged about the drum. Each portion of the paper is thereby developed, rinsed, fixed, and finally washed. Upon emerging from this wet drum, the paper moves about the second or dry drum and is dried by the jets of warm air issuing from the impingement dryer encircling the same.

The illustrative embodiment of this invention deals with improvements in the machine of the aforementioned application, and is concerned more specifically with automatic strip handling mechanism for initially feeding the strip of photographic material to be treated onto the wet drum, automatically transferring the strip from the wet drum to the dry drum, and finally automatically rewinding the strip on a take-up roll as it emerges from the dry drum. It will become apparent as the description proceeds, however, that the present strip handling mechanism is susceptible of numerous other embodiments and uses.

The entire operation of the present machine, briefly outlined above, including the additional operation of ejecting one strip which has been completely rewound on a take-up roll in response to feeding of a subsequent strip through the machine, is automatic except for initial manual positioning of a core attached to the leading edge of the strip in operative position relative to the wet drum to accomplish automatic threading of the strip into the machine.

With the foregoing preliminary discussion in mind, a broad object of this invention may be stated as being the provision of a new and improved strip handling mechanism for photographic processing machines and the like.

A more specific object of the invention is the provision of strip handling mechanism for photographic processing machines and the like of the type embodying a plurality of strip transports for successively feeding a strip of material, which mechanism is operative to automatically feed a strip of material to a first transport, transfer the strip from the first to a subsequent transport as it emerges from the first transport, rewind the strip on a take-up roll as it emerges from the final transport, and finally to eject the completely rewound take-up roll into a receiver in response to feeding of a subsequent strip through the mechanism.

Another object of the invention is the provision of strip handling mechanism of the character described wherein a driving connection between the strip and the strip transports is afforded by engagement of cleats on the transports with a rigid core attached to the leading edge of the strip and wherein further the aforementioned threading, transferring, rewinding and ejecting operations are completely automatic, except for initial manual positioning of the core in pick-up relationship to the cleats of the first transport.

Yet a further object of the invention is the provision of strip handling mechanism of the character described which embodies certain interlock features which prevent initial manual positioning of the core, attached to the leading edge of the strip, in pick-up relationship to the first transport under certain conditions so as to assure proper engagement of the core with the cleats of the first transport.

Still a further object of the invention is the provision of strip handling mechanism of the character described which is capable of handling strips of various widths and wherein means are provided for assuring accurate centering of the strip with respect to the strip transports so as to assure proper feeding of the strip through the mechanism.

A further object of the invention is the provision of novel apparatus for operatively engaging the leading edge of a strip of material with a moving strip transport.

Yet a further object of the invention is the provision of novel transfer mechanism, for use in a machine embodying a pair of strip transports for successively feeding a strip, for transferring the strip from one transport to the other.

Still a further object of the invention is the provision of novel take-off mechanism for automatically extracting the leading edge of a strip of material from a moving strip transport and rewinding the strip on a take-up roll.

And yet a further object of the invention is the provision of take-off mechanism, as in the foregoing object, which is operative to automatically eject a completely rewound take-up roll into a receiver in response to feeding of a subsequent strip to the mechanism.

A further object of the invention is the provision of a new and improved automatic film processing machine for treating relatively long strips of exposed, sensitized photographic material.

Other objects, advantages and features of the invention will become apparent as the description proceeds.

Briefly, the foregoing and other objects are achieved in the illustrative embodiment of the invention by the provision of a main frame on which are journalled a pair of so-called wet and dry drums. Arranged about the wet drum are a series of nozzles for directing sprays of photographic processing solutions toward the wet drum. A curved impingement dryer is arranged about the dry drum for directing jets of warm air toward the latter drum.

Mounted on a platform located between these drums is a receiver for holding a supply roll of a strip of photographic material to be treated. During operation of the machine, the strip of material is fed first around the wet drum so as to pass through the solution sprays in succession. The exposed emulsion of the strip is thereby developed, rinsed, fixed, and finally washed. The strip is thereafter fed about the dry drum so as to be dried by the jets of warm air issuing from the impingement dryer and is finally rewound on a take-up roll as it emerges from the dry drum.

A rigid core, having a length somewhat greater than the width of the strip to be treated, is provided for removable atachment to the leading edge of the strip. The machine embodies novel loading mechanism including a pair of arms, for supporting opposite ends of this core, which are manually movable toward and away from the wet drum. When threading a strip of material onto the wet drum, these arms, supporting opposite ends of the core, as just described, are manually shifted from a position remote from the wet drum to a position wherein the core is proximate to the peripheral surface of the drum.

This drum, which is driven in rotation, carries a series of circumferentially spaced cleats which extract the core from the arms of the loading mechanism as the drum rotates, thereby dragging the strip of material about the drum. Interlocking means are provided for preventing maloperation of this loading mechanism.

Extending between the drums, below the aforementioned platform, is a transfer mechanism. This transfer mechanism comprises a pair of chain drives carrying core receiving cups which are moved in synchronism with the rotation of the wet drum. The cups on the transfer mechanism extract the core, which is being carried around by the cleats of the wet drum, from the latter when the core reaches a predetermined angular position and moves the core to a position adjacent the periphery of the dry drum. The strip of paper attached to the core is, of course, pulled along behind the latter, suitable guide rollers being provided to support the strip during its passage from the wet drum to the dry drum.

The dry drum which is driven in synchronism with the transfer mechanism also mounts a plurality of circumferentially spaced cleats which extract the core from the transfer mechanism. The core and the strip of paper affixed thereto are thereby carried around the dry drum to a take-off mechanism.

This take-off mechanism comprises means for extracting the core from the dry drum and, thereafter, automatically rotating the core to effect rewinding thereon of the strip of material attached thereto. The entire strip of material is, therefore, fed about the wet drum, transferred to the dry drum, fed about the latter drum and finally rewound on the core attached to its leading edge.

The take-off mechanism is automatically operable in response to movement of a subsequent core to the mechanism to eject the now completely rewound roll comprising the first strip of material, into a receiver located below the take-off mechanism and to commence rewinding of the second strip of material on its core.

The entire operation of the machine, briefly described above, is automatic except for initial manual operation of the loading mechanism to position the core attached to a strip of material to be treated in pick-up relationship to the wet drum. Such a position is, of course, that in which the core is located to be engaged by the cleats of the drum as the latter rotates.

In order to enable high speed processing of photographic materials, the film processing solutions are preferably heated to elevated temperatures. Under these conditions, the present film processing machine is capable of treating relatively long lengths of photographic material at an appreciably higher rate than has been heretofore possible. The entire machine is of relatively simple and inexpensive construction, easy to operate and relatively immune to malfunctioning.

A better understanding of the invention may be had to the following detailed description taken in connection with the accompanying drawings, wherein:

Figure 1 is a front elevational view of the present film processing machine;

Figure 2 is a top plan view of the machine of Figure 1;

Figure 3 is a rear elevational view of the present machine;

Figure 3A is a detail in perspective and partially broken away illustrating certain structural features of the impingement dryer embodied in the present machine;

Figure 4 is an enlarged front elevational view of the center portion of the present machine and illustrates the loading mechanism, transfer mechanism and take-off mechanism embodied in the machine;

Figures 5 through 8 are detail views illustrating the operation of the loading mechanism of the present machine;

Figure 8a is an enlarged section illustrating the manner of attachment of a core to the strip of material;

Figure 9 is an enlarged detail illustrating the manner in which a core, attached to the leading edge of a strip of material to be treated, is extracted from the loading mechanism by cleats attached to the wet drum of the present machine;

Figure 10 is an enlarged view looking in the direction indicated by arrow on line 10 in Figure 7;

Figure 11 is a section taken along line 11—11 of Figure 10;

Figure 12 is a section taken along line 12—12 of Figure 10;

Figure 13 is a view looking in the direction indicated by the arrow 13 in Figure 11;

Figure 14 is a section taken through the transfer mechanism along line 14—14 of Figure 4;

Figures 15 and 16 are detailed views illustrating the manner in which a core is extracted from the wet drum of the machine by the transfer mechanism for transfer of the core to the dry drum;

Figures 15a and 16a are still further enlarged detail views illustrating the manner in which a core is extracted from the transfer mechanism by cleats on the dry drum;

Figure 17 is an enlarged section taken along line 17—17 of Figure 1;

Figure 18 is an enlarged section taken along line 18—18 of Figure 1;

Figures 19 and 20 are enlarged front elevational views on the take-off mechanism embodied in the present machine and illustrate the operation of such mechanism;

Figure 21 is a view looking in the direction of the arrow 21 in Figure 19;

Figure 22 is a view looking in the direction of the arrow 22 in Figure 21;

Figures 23 through 28 are diagrammatic views illustrating the operation of the present machine; and Figure 29 is a diagrammatic illustration of the fluid system, embodied in the machine, for handling the photographic processing solutions.

Figure 26:
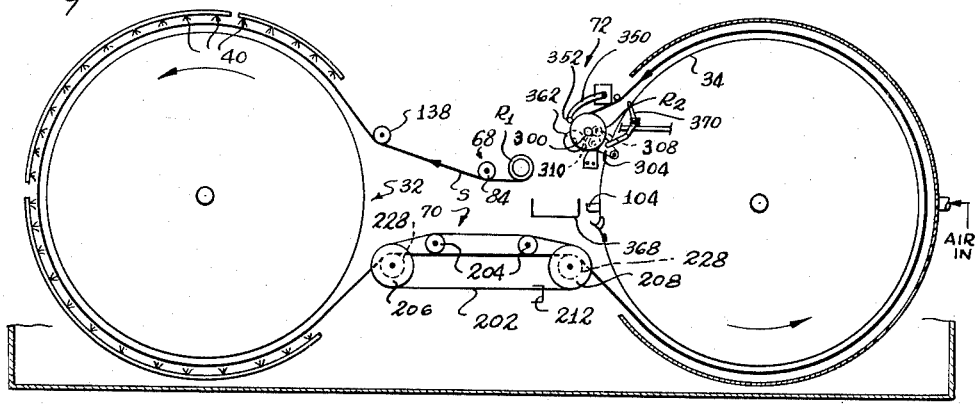

Referring now to these drawings, and first to Figures 1 and 2, the present machine will be seen to comprise a main frame 30 on which are horizontally journalled a pair of spaced drums 32 and 34. Drums 32 and 34 comprise, respectively, the wet and dry drums previously referred to. These drums are driven in the same direction of rotation from a variable speed drive motor assembly 36 through a drive sprocket 37 and chain drive 38. As viewed in Figures 1 and 4, the drums 32 and 34 are driven in a counterclockwise direction of rotation.

Located about the wet drum 32 are a series of circumferentially spaced nozzles 40 for directing sprays of photographic processing solutions toward the surface of the wet drum. These nozzles are supplied with solution under pressure by means of the fluid storage and delivery system illustrated in Figure 29 and to be hereinafter described.

As preliminarily mentioned, and hereinafter more fully discussed, a strip S of photographic material to be treated is fed about the wet drum 32 so as to pass through the sprays issuing from the nozzles 40. The emulsion of the paper is thereby developed, rinsed, fixed and washed.

When processing a strip of sensitized paper, it is desirable, for reasons fully set forth in the aforementioned co-pending application as well as co-pending application, Serial No. 671,473, filed July 12, 1957 and entitled Air Cushion for Photographic Processing Machine that the back of the paper be maintained in a dry condition during passage about the wet drum. To this end, the wet drum 32 may be constructed, as described more fully in the latter co-pending application, so as to define a hollow annular chamber 42 (Figure 17) which is supplied with air under pressure from a blower 44 (Figures 2 and 3) through a conduit 46 including a swivel coupling 48 at the hub of the wet drum 32, and radial conduits 50 communicating to the annular chamber 42. Air exhausts from the chamber 42 to the underside of the paper through perforations 52 in the surface of the drum. For a more detailed description of this air cushion supporting means for paper processing machines, reference should be had to the latter co-pending application, Serial No. 671,473.

Extending circumferentially about the dry drum 34 is a curved plenum chamber 54 (Figures 1, 3, 3a and 18), the inner wall of which is formed with perforations 56. Extending across this chamber at circumferentially spaced positions are a series of electrical heating elements 58.

Plenum chamber 54 is supplied with air under pressure from a second blower 60 (Figures 3 and 3a). The air in the plenum chamber is heated by the heaters 58 and exhausts through the perforations 56 toward the surface of the dry drum 34. The strip of photographic material being treated, after emerging from the wet drum 32, wherein it was developed, fixed and rinsed, is dried during its passage about the dry drum by the jets of warm air discharging through the perforations 56 of the plenum chamber. This method of drying a strip of developed photographic material is more fully described in the aforementioned copending application, Serial No. 671,473.

The suction openings of both of the blowers 44 and 60 communicate with a chamber 62 (Figure 3) into which air is drawn through a suitable filter 64 forming one wall of the chamber.

As indicated in Figures 1, 2 and 3, the drums 32 and 34 are enclosed within a metal casing 66 made up of suitably configured sheet metal plates bolted or otherwise conveniently attached to the main frame 30 of the machine. The reason for so enclosing the drums is to confine the vapors which are evolved from the heated solutions discharging through the spray nozzles 40. These vapors may be exhausted to atmosphere by a suitable exhaust blower, not shown, having a suction opening communicating to the interior of the casing 66.

Briefly, during operation of the present machine, a strip S of photographic material to be treated is fed through the machine so as to pass first around the wet drum 32 and finally around the dry drum 34, with the emulsion side of the material facing away from the drums. During passage of the strip about the wet drum 32, as previously mentioned, the emulsion of the material is successively subjected to the developing, rinsing, fixing and washing sprays which are discharged from the nozzles 40, arranged about the drum. Upon emerging from the drum 32, therefore, the emulsion is fully developed, fixed and washed.

Upon passage of the now developed strip about the dry drum 34, the material of the strip is dried by the jets of warm air discharging from the plenum chamber or impingement dryer 54.

The strips of photographic material to be treated in the present processing machine are generally supplied in rolls, each comprising a relatively long strip. As preliminarily indicated, the present machine comprises a loading mechanism, generally indicated at 68, for supporting a roll of material to be treated in centered relationship with respect to the drum 32 and 34 and for initially threading the leading edge of the strip comprising this roll onto the rotating wet drum 32, a transfer mechanism, generally indicated at 70, for transferring the strip from the wet drum 32, as it emerges from the final spray zone of the latter drum, to the dry drum 34, and, finally, a take-off mechanism generally indicated at 72, for rewinding the strip on a take-up roll after it emerges from the dry drum 34. These three mechanisms of the present machine are illustrated on somewhat enlarged scale in Figure 4. Also, the loading assembly 68 is shown in detail in Figures 6 through 13, while the transfer mechanism 70 is detailed in Figures 14 through 16, and details of the take-off mechanism 72 are shown in enlarged scale in Figures 19 through 22. These three mechanisms will now be described in greater detail in the order given.

*Loading mechanism*

Referring now to Figures 4 through 13, the loading mechanism 68 will be seen to be supported on an elevated platform 74, located intermediate the drums 32 and 34. This platform is spaced a short distance above the horizontal plane passing through the axes of the drum and is fixed to the main frame 30 of the machine in any suitable manner.

Fixed to the upper surface of this platform 74 is a cradle 76 for holding a supply roll $R_1$ of a strip to be processed in the machine. This cradle is comprised of a fixed support 78 including an upstanding back 80 and an upper surface 82 which inclines downwardly in the direction of the wet drum 32, a roller 84 which is journalled at opposite ends in upstanding brackets 86 fixed to a platform 74, and end plates 88 which are adjustable toward and away from one another. As shown in Figures 4–7, a supply roll $R_1$ of a strip of material to be processed is adapted to be held in the cradle 76 with the periphery of the roll resting against the inclined surface 82 of the support 78 and the roller 84. The end plates 88 are adjusted to loosely receive the supply roll $R_1$ therebetween and serve to limit endwise movement of the supply roll.

The end plates 88 are threadedly engaged with right and left hand threads, respectively, formed on a shaft 90 (Figure 2) which is journalled at opposite ends in a pair of upstanding brackets 92 fixed to the platform 74. The forward end of this shaft mounts a knurled handle 94 by which the shaft 90 can be turned and a knurled lock nut 96 for locking the shaft 90 in an adjusted angular position.

End plates 88 have flat lower edges slideably engaging the upper surface of a plate 98 fixed to the platform 74 so as to be capable of movement toward and away from one another while being prevented from turning about the axis of the threaded shaft 90. Owing to the right and left hand threaded connections between the plates 88 and shaft 90, it will be clear that when the latter is rotated in one direction, the plates 88 will be moved toward one another and when the shaft 90 is turned in the opposite direction, the plates 88 will be moved away from one another, the linear travel of the plates, of course, being equal.

The end plates 88 are thus adjustable to accommodate supporting of rolls $R_1$ of different lengths, corresponding to strips of different widths, in the cradle 76. When setting up the machine for a strip of material of given width, the supply roll $R_1$ of the strip is supported in the cradle 76. The end plates 88 are first moved into contact with the ends of the roll and then backed off slightly so that the roll is loosely received between the end plates. The end plates 88 are so initially positioned on the shaft 90 as to always locate a supply roll $R_1$ in the cradle 76 in centered relationship to the drums 32 and 34 regardless of the length of the roll.

As will be seen, the cradle roller 84 also serves to guide the strip of material as it is fed onto the wet drum. To this end, the roller 84 has a length substantially equal to the axial lengths of the drums 32 and 34. This length is slightly greater than the width of the widest strip of material to be handled by the machine. In order to accommodate adjustment of the end plates 88 to center a supply roll $R_1$ of minimum length, corresponding to strip material of minimum width, the fixed roll support 78 has a dimension, measured in a direction axially of the drums 32 and 34, which is somewhat less than this minimum width and is centered with respect to the drums 32 and 34, as may be observed most clearly in Figure 2.

As preliminarily indicated, in order to accomplish semi-automatic threading of the strip of material to be processed through the machine, a rigid core is removably attached to the leading edge of the strip. This core is indicated at 100 in the drawings and is shown in section in Figure 8a. This core has a length which is slightly greater than the axial dimension of the drums 32 and 34 and is attached to the leading edge of a strip S of material by means of a split resilient sleeve 102, as shown in Figure 8a. Thus, when attaching a core to a strip S, the leading edge of the latter is wrapped around the core, in such manner that opposite ends of the core extend beyond the side edges of the strip. The sleeve 102 is then placed over the core to firmly bind the strip to the core.

Fixed to opposite sides of each of the drums 32 and 34 at equiangularly spaced positions therearound and projecting outwardly beyond the peripheral surface thereof, are a series of cleats 104. These cleats are engageable with opposite ends of the core 100 to provide a driving connection between the core and drums so as to enable strip S to be fed through the machine. Located forwardly of each of these cleats 104, in the direction in which the respective drums turn, is a resilient retaining clip 106. These clips comprise a flexible leaf 108 which normally inclines away from its respective drum toward its adjacent cleat 104, as may be observed most clearly in Figure 9. Integrally joined to the outer end of this leaf 108 and extending radially inwardly of the drum in sliding contact with the adjacent side surface of the latter is a tongue 110 having a concaved trailing edge. These retaining clips 106 serve to retain opposite ends of a core 100 in engagement with cleats 104 in the event a core is inadvertently fed into the machine by itself so as to not be held against the cleats by the tension of a trailing web of paper.

In addition to the cradle 76, the loading mechanism 68 comprises mechanism 112 for effecting initial, semi-automatic engagement of a core 100, attached to the leading edge of a strip S to be processed, with a set of cleats 104 on the wet drum 32. This core loading mechanism comprises a pair of parallel, spaced brackets 114 of generally L-shaped configuration. One leg of the brackets 114 projects upwardly beyond the upper surface of the platform 74 through slots 116 in the latter. Formed in the opposing sides of these legs and opening through the upper ends of the latter are generally U-shaped pockets 118 for receiving opposite ends of the core 100. The other legs of the brackets 114 are located below and substantially parallel the platform 74.

Each of these latter legs of the brackets 114 is pivotally connected to the upper end of a pair of pivotal links 120 and 122. The lower ends of the links 120, in turn, are journalled on a horizontal shaft 124 which is fixed at opposite ends to a pair of depending, vertical support plates 126. Plates 126 are fixed to the underside of the platform 74 outwardly of the bracket arms 114. The lower ends of the other links 122 are non-rotatably fixed to a second horizontal shaft 128, paralleling the shaft 124.

The forward end of the shaft 128, which is the right hand end of the shaft as viewed in Figures 10 and 11, mounts a handle 130 by which the shaft 128 may be turned. As may be observed most clearly in Figures 4 through 7, the links 120 and 122 are of equal length and parallel one another so as to form, in effect, a parallel linkage mechanism. From this description, it will be clear that the upstanding arms of the brackets 114 may be shifted in translation from a retracted position remote from the wet drum 32, which position is illustrated in Figures 4 and 5, to an extended position, illustrated in Figures 7 and 9, wherein the upstanding bracket arms are located at opposite sides of the wet drum 32 and a core 100, supported in the pockets 118 of these bracket arms, is positioned substantially tangent to the peripheral surface of the wet drum.

From the description thus far of the core loading mechanism 112, it will be seen that when the brackets 114 are in their extended position of Figures 7 and 9, a core 100 supported in the pockets 118 of the brackets is located in the path of the clips 106 and cleats 104 on the wet drum 32, as the latter rotates. Assuming the parts to be in position of Figure 9, therefore, it will be seen that rotation of the drum 32 in a counterclockwise direction indicated, results first in contact of a core 100 with the clips 106. These clips are flexible, as mentioned above, and are depressed toward the drum by the core so as to permit relative movement of the latter over the clips to the position of Figure 7. In this position, opposite ends of the core are engaged by the following set of cleats 104. As shown in Figure 7, after movement of the clips 106 past the core 100, they return to their normal position to retain the ends of the core in engagement with the cleats 104.

As will presently be more fully described, continued rotation of the drum 32 beyond the position of Figure 7 results in extraction of the core 100 from the pockets 118 of the brackets 114, the core being thereafter carried around with the wet drum 32 as the latter rotates. Outward radial movement of the core 100 out of engagement with the cleats 104 is prevented by a pair of L-shaped angle guides 132 fixed to the frame 30 of the machine. These angles 132 are bent into cylindric shape and have flanges 134 which encircle the drum 32 at opposite sides thereof and overlie the ends of the core 100, as may be observed most clearly in Figure 17, so as to restrain the core against radial movement away from the drum 32 and out of driving engagement with the cleats 104. The vertical flanges 136 of the angles 132 are spaced to restrain the core 100 against endwise movement, as shown in Figure 17.

As shown most clearly in Figure 4, one end of the angles 132 terminates just above the upper ends of the brackets 114 when the latter are in the extended position of Figure 9, so that the core 100 moves below the flanges 134 of the angles immediately after extraction from the pockets 118 of the brackets 114. During operation of the machine, of course, a strip S of material to be processed is attached to the core and is pulled along with the latter as it rotates with the drum 32 in the manner just described. As shown in Figures 5 through 7, this strip S passes below the cradle roller 84 and a second guide roller 138, located proximate to the wet drum 32. Roller 138 is journalled on a shaft 140 which is fixed at opposite ends in a pair of upstanding brackets 142 on the platform 74. As may be observed most clearly in Figures 10 and 11, the roller 138 is located and axially dimensioned to be straddled by the brackets 114 when the latter are in their extended position of Figures 7 and 9. The supporting shaft 140 for the roller 138 is reduced at 144 to clear the upper ends of the vertical bracket arms when the latter are in extended position.

Briefly, in operation of the loading mechanism 68, thus far described, a supply roll $R_1$ of a strip S to be processed is supported in the cradle 76 in the manner illustrated in Figures 5 through 7, and opposite ends of a core 100 attached to the leading edge of the strip S is seated in the pockets 118 of the brackets 114. As shown in these latter figures, the strip S passes below the cradle roller 84.

To accomplish threading of the strip onto the wet drum 32, the brackets 114, carrying the core 100, are shifted from their retracted position of Figure 5 to their extended position of Figure 7, by turning of the handle 130 of the core loading mechanism 112 in a counterclockwise direction. Drum 32 will, at this time, be rotating in a counterclockwise direction, as viewed in the figures, by the drive assembly 38, so that a pair of cleats 104 on the drum will be rotated into engagement with opposite ends of the core 100. The core 100 is thereby extracted from the pockets 118 of the brackets 114 and rotated with the drum, the strip S being dragged along with the core so as to be eventually wrapped around the wet drum 32. The cradle roller 84 and guide roller 138 guide the strip S onto the drum.

As the strip is fed into the machine, of course, it is unwound from the supply roll $R_1$, the latter being rotatably supported in the cradle for such unwinding of the strip by the fixed support surface 82 and the cradle roller 84. As the diameter of the roll decreases due to unwinding of the strip S therefrom, it gradually drops in the cradle.

Embodied in the core loading mechanism 112 are interlock means 146, to be now described, for preventing shifting of the brackets 114, and core 100 supported thereon, from the retracted position of Figure 5 to the extended position of Figure 7 when a set of cleats 104 on the drum 32 are located in the path of the core 100 during shifting of the latter to the aforesaid extended position with the brackets 114. Shifting of the brackets and core to the extended position at such times would very likely result in jamming of the machine by wedging of the core between the cleats 104 and the ends of the guide angles 132. This interlock means 146 is so constructed as to limit shifting of the brackets 114, in the direction of their extended position, to the intermediate position illustrated in Figure 6. In this position, the cleats 104 on the drum 32 just clear a core 100 supported on the brackets 114.

This interlock means comprises a pair of spaced latch supporting plates 148 which are fixed against rotation on the parallel linkage mechanism shaft 128. Pivotally supported at one end on and located between these plates 148 is a pivotal latch member 150.

Latch member 150 is formed with a lower latching detent 152 which is releaseably engageable in a slot 154 formed in a collar 156 journalled on the shaft 128 between the plates 148. Latch member 150 is biased toward the collar 156 by means of a tension spring 158, connected between the latch member and the plates 148.

Rigid on and extending radially from the collar 156 is an arm 160. Assuming for the moment that the latching detent 152 of the latch member 150 is engaged in the slot 154 in the collar 156, it will be seen that the collar is locked against rotation relative to the latch supporting plates 148 and hence the shaft 128. Under these conditions, when the shaft 128 is turned, by the handle 130, in a counterclockwise direction to shift the core supporting brackets 114 toward their extended position, the collar arm 160 swings with the shaft 128 in a counterclockwise direction from the normal position (Figure 5) it occupies when the brackets 114 are in their retracted position. In this normal position of the arm 160, it will be seen to be substantially vertical.

Located in the path of swinging movement of the arm 160 is a cam 162 which is fixed to a shaft 164 journalled at opposite ends in the depending support plates 126. Shaft 164 mounts a sprocket 166 (Figures 10 and 11) which is engaged with the sprocket chain 38 (Figure 4) by which the drums 32 and 34 are driven in rotation from the motor assembly 38. From this description, it will be seen that the cam 162 is rotated in synchronism with the drum 32.

Cam 162 is formed with a first cylindric portion 168 (Figure 8) and a diametrically opposite second cylindric portion 170, the radius of which is somewhat greater than the radius of the first cylindric portion 168. The radius of the first cylindric portion 168 of the cam is such as to limit counterclockwise swinging of the arm 160 to its solid line position of Figure 8, while the radius of the enlarged cam portion 170 is such as to limit counterclockwise swinging of the arm 160 to its phantom line position of Figure 8 which will be observed to be somewhat short of the aforesaid solid line position.

Assuming now for the moment that the parts of the core loading mechanism 112 are in their retracted position of Figure 5, the latching detent 152 of the latch member 150 to be engaged in the slot 154 of the collar 156, so that the arm 160 is locked against rotation on the shaft 126, and the cam 162 be oriented, as shown in Figure 6, with its enlarged cam portion 170 in the path of the arm 160, it will be clear that turning of the handle 130 to shift the core supporting brackets 114 in the direction of their extended position of Figure 7 is limited by abutment of the arm 160 with the enlarged cam portion 170. In this limiting position of the parts, the core supporting brackets 114 are in their intermediate limiting position of Figure 6. As previously described, in this latter position of the brackets 114, the cleats 104 on the drum 32 just clear a core 100 supported on the brackets.

If now the cam 162 is rotated in a counterclockwise direction from the position of Figure 6 to its position of Figure 7, wherein the reduced portion 168 of the cam 162 is located in the path of the arm 160, the handle 130 may now continue to turn until the arm 160 has moved from the position of Figure 6 to the position of Figure 7, wherein it engages the reduced portion 168 of the cam 162. In this latter position of the parts, the core supporting bracket arms 114 are located in their fully extended position wherein a core 100 supported thereon is located in the path of the cleats 104 on the drum 32.

The diameter of the cam sprocket 166 and the shape and orientation of the cam 162 are such that the enlarged portion 170 of the cam is located in the path of the arm 160, so as to limit shifting of the core supporting arms 114 to their intermediate limiting position of Figure 6, whenever a set of cleats 104 on the drum 32 are located in the path of the core. Similarly, the reduced portion 168 of the cam 162 will be located in the path of the arm 160, so as to permit shifting of the core supporting brackets 114 to their fully extended position of Figure 7, during those periods in which portions of the drum between adjacent sets of cleats are moving across the path of the core. Jamming of the machine due to wedging of the core between a set of cleats and the ends of the angle guides 132, is thereby, effectively prevented.

Fixed to the adjacent supporting plate 126 of the core loading mechanism 112 is a pin 172 which is located in the path of a bevelled end 174 of the latch member 150 during rotation of the latter with the shaft 128 to shift the core supporting brackets 114 to their extended position of Figure 7. As illustrated in Figures 6, 7 and 8, rotation of the shaft 128 to shift the brackets 114 from their intermediate limiting position of Figure 6 to their extended position of Figure 7 brings the bevelled end 174 of the latch member 150 into engagement with the pin 172. This results in upward camming of the latch member 150 to disengage the latching detent 152 from the slot 154 in the collar 156. With the latching detent 152 thus disengaged from the collar 156, the latter and its arm 160 are free to swing on the shaft 128. Arm 160, which is biased toward the cam 162 by means of a spring 176 connected between the arm and platform 74, is thus free to oscillate back and forth as the cam 162 rotates without imparting oscillation to the shaft 128. Oscillation of shaft 128, of course, would cause the core supporting brackets 114 to move back and forth between their intermediate limiting position and extended positions of Figures 6 and 7. This releaseable latching action is embodied in the core loading mechanism 112 to enable retention of the core supporting brackets in their extended position of Figure 7, once they have been moved to that position, until the handle 130 is deliberately turned in the clockwise direction to shift the brackets to the retracted position of Figure 5 after extraction of the core 100 from the brackets by the cleats 104 in the drum 32.

Fixed to the rear end of the parallel linkage mechanism shaft 128, which is the left end of the shaft as viewed in Figures 10 and 11, is a downwardly extending arm 178. Connected between a pin 180 on the lower end of this arm and a pin 182 fixed in the left-hand supporting plate 126 is a coil tension spring 184. As may be observed most clearly in Figure 13, the pin 182 is directly above the shaft 128. Spring 184, therefore, provides an over-center biasing means for the shaft 128 and tends to rotate the latter in a clockwise direction, as viewed in Figure 13, when the arm 178 is turned slightly to the left of its center position, as illustrated in Figure 13. Conversely, when the arm 178 is rotated just slightly to the right of its dead center position, the spring 184 tends to rotate the shaft 128 in a clockwise direction, as viewed in Figure 13. The arm 178 is so orientated relative to the shaft 128 as to move in the clockwise direction (as viewed in Figure 13) across its dead-center position just prior to shifting of the core supporting brackets 114 from their retracted position of Figure 5 to their intermediate limting position of Figure 6. When the brackets 114 are in the latter position, therefore, spring 184 as well as spring 176 bias the brackets toward the fully extended position of Figure 7.

Fixed to an intermediate portion of the shaft 128 are a pair of stop arms 186 (Figure 12) which are engageable with the shafts 124 and 164 of the core loading mechanism 112 to limit rotation of the shaft 128 in opposite directions between the position of Figure 5, wherein the brackets 114 are in their retracted position, and the position of Figure 7, wherein the brackets 114 are in their extended position.

Briefly reviewing the operation of the loading mechanism 68, a supply roll $R_1$ of a strip S of material to be processed is placed in the cradle 76. The end plates 88 are now adjusted by turning of the plate adjusting handle 94 (Figure 2) until the plates contact the ends of the roll. This centers the roll $R_1$ regardless of its length with respect to the drums 32 and 34. The plates are now backed off slightly until the roll $R_1$ is freely rotatable in the cradle.

Core 100 is now attached to the leading edge of the strip S and seated in the pockets 118 of the core supporting brackets 114 with the strip passing below the cradle roller 84. The brackets 114 are, at this time, in the retracted position of Figure 5.

The core supporting brackets 114 and the core 100 supported thereon are now shifted toward the wet drum 32 by turning of the handle 130 in a counterclockwise direction, as viewed in Figure 1. If at this time a set of cleats 104 on the drum 32 are located in the path of the core 100 carried on the brackets 114, movement of the latter is limited by the cam 162 to the intermediate limiting position of Figure 6, wherein the cleats 104 just clear the core 100. The handle 130 may now be released, if desired. The springs 184 and 176 of the core loading mechanism 112 retain the brackets 114 in the position of Figure 6.

Upon rotation of the cam 162, in synchronism with rotation of the drum 32, to a position wherein the arm 160 is released for movement from the position of Figure 6 to that of Figure 7, the bracket arms 114 and core 100 will be shifted, under the action of the springs 184 and 176, to the fully extended position of Figure 7. Continued rotation of the drum 32 with the brackets 114, in this extended position, results in engagement of a following set of cleats 104 on the drum with opposite ends of the core 100 to extract the core from the pockets 118 in the brackets, and subsequent rotation of the core with the drum. The strip S attached to the core is pulled onto the drum 32 with the core and passes around the drum as the latter rotates, roller 138 guiding the strip onto the drum.

Upon movement of the core supporting brackets 114 to their extended position of Figure 7 under the action of the springs 176 and 184, the latch 150 is disengaged from the collar 156 so that the brackets 114 will be retained in their extended position of Figure 7 while the collar 156 and its arm 160 will be oscillated by the rotating cam 162. When it is desired to reset the loading mechanism for loading of a subsequent strip into the machine, the handle 130 is rotated in a clockwise direction back to the position of Figure 1. This rotation of the handle, of course, imparts clockwise rotation to the shaft 128 and the latch supporting plates 148 fixed thereto. The latch 150 is thereby disengaged from its releasing pin 172 and is biased against the oscillating collar 156 by the spring 158.

During this oscillation of the collar 156, the latching detent 152 will become aligned with the slot 154 in the collar and reengage in the slot to lock the collar 156 and shaft 128 against relative rotation. Continued turning of the handle 130 in a clockwise direction to its normal position of Figure 1, therefore, results in movement of the parts of the loading mechanism to their normal retracted position of Figure 5 in readiness for the next loading operation.

During the passage of the strip S about the wet drum 32, it passes through the successive sprays which are discharged from the spray nozzles 40 arranged about the drum and is thereby developed, fixed, rinsed, washed, as previously mentioned. Upon rotation of the core 100 with the drum 32 through approximately 340 degrees, the core 100 and the strip S attached thereto are transferred to the dry drum 34 for rotation with the latter through the jets of warm air issuing from the impingement dryer 54. This transfer of the core and strip from the wet drum to the dry drum is accomplished, as previously mentioned, by the transfer mechanism 70. This transfer mechanism will now be described with reference primarily to Figures 1, 4 and 14 through 16a.

*Transfer mechanism*

The transfer mechanism 70 is supported on a second horizontal platform 200 located a distance below the first mentioned platform 74 which supports the loading mechanism 68. This lower platform 200 is fixed to the frame 30 of the machine in any suitable manner.

Transfer mechanism 70 comprises a pair of sprocket chains 202 which are supported on a series of sprockets 204, 206 and 208, journalled on upstanding bracket arms fixed at their lower ends to the lower platform 200, as shown most clearly in Figure 4. As may be observed most clearly in Figure 14, the sprocket chains 202 and their sprockets are located in vertical planes spaced a distance beyond opposite sides of the drums 34 (and 32).

Fixed to each of the chains 202 at spaced positions therealong are a series of core supporting cups 210 for supporting on opposite ends of the core 100. To this end, each of the cups 210 has an inwardly opening pocket 212 for receiving the end of the core. The leading side of this pocket, in a direction in which the respective chain 202 travels, which direction is indicated by the arrow in Figure 4, as well as outer side of each cup, are open to accommodate entrance of the ends of the core into the pocket 212. Each of the cups 210 is also provided with a forward, inclined ramp 214 for guiding the ends of the core into the pockets of the cups 210, as will be presently more fully appreciated.

Sprockets 208 of the transfer mechanism 70 are fixed to a shaft 216 which mounts a drive sprocket 218 (Figure 14). Trained about this drive sprocket 218 and a large sprocket 220 driven from the motor assembly 38 is a drive chain 222. The transfer chains 202 are thus driven in the direction indicated in synchronism with rotation of the drums 32 and 34.

The left-hand sprockets 206 of the transfer mechanism, as viewed in Figure 4, are so located relative to the drum 32 that the core supporting cups 210 on the chains move along curved paths, when travelling about the latter sprockets 208 which are substantially tangent to the paths described by the ends of a core 100 rotating with the drum 32. As shown most clearly in Figure 4, the lower ends of the guide angles 132 about the wet drum 32 terminate just short of the left-hand sprockets 206 of the transfer mechanism.

Extending from the radially inner edges of the vertical flanges 136 of the guide angles 132 are a pair of guide rails 224 which curve about the end sprockets 206, concentric therewith, and then follow the contour of the upper runs of the chains 202. As shown most clearly in Figure 14, these rails 224 overlie the core supporting cups 210 which project a distance inwardly of their respective chains 202. These guide rails 224 serve to retain the ends of the core 100 in the pockets 212 of the cups 210, which pockets also open outwardly of the chains 202, as mentioned.

The speed of the chains 202 substantially equals the peripheral speed of the drum 32. Also, the locations of the cups 210 on the chains 202, which cups are aligned on the two chains, are such that a pair of aligned cups on the two chains 202 travel around the left-hand end sprockets 206 each time a set of cleats 104 on the drum 32 are rotated to a position adjacent the left-hand sprockets 206. As may be observed most clearly in Figure 17, the ends of the core 100 project a distance beyond the cleats 104. The cups 210 on the transfer chains 202 are so laterally spaced as to engage the projecting ends of the core 100, outwardly of the cleats 104, as the core is carried to the point of tangency with the path traversed by the cups 210 when passing around the left-hand sprockets 206.

Thus, referring to Figures 15 and 16, it is seen that the rotation of the drum 32 and travel of the transfer chains 202 are so synchronized that upon rotation of the core 100 with the drum 32 to a position of approximate tangency with the path traversed by an aligned pair of cups 210 on the transfer chains about the left-hand sprockets 206, a set of such aligned cups 210 on the transfer chains are approaching opposite ends of the core from the rear as shown in Figure 15. The circumferential rate of travel of the chains 202 about the sprockets 206 is somewhat greater than the circumferential speed of the drum 32, with the result that the cups 210 engage over the ends of the core 100, which is now located in the path of the cups, and extract the core from the drum 32, as shown in Figure 16. The guide rails 224 overlying the transfer chains guide the core from the drum 32 to the transfer mechanism 70 and thereafter retain the core from upward movement out of the cups 210 during travel of the latter along the upper runs of the chain toward the dry drum 34.

As previously described and as illustrated in the drawings, the dry drum 34 is provided with sets of circumferentially spaced cleats 104 and retaining clips 106 in the same manner as the wet drum 32. The cleats 104 on the dry drum serve to extract the core from the cups 210 of the transfer mechanism 70 and provide a driving engagement between the drum 34 and the core 100 for rotation of the latter with the drum.

To this end, the right-hand transfer chain sprockets 208 are so located relative to the drum 34 that the paths traversed by the aligned sets of cups 210 on the transfer chains during movement about the right-hand sprockets 208 are substantially tangent at one point to the paths traversed by the cleats 104 on the drum 34. The transfer chains 202 and the drum 34 are driven in synchronism in such manner that a set of aligned cups on the transfer chains move across the points of tangencies of the aforesaid path immediately ahead of each set of cleats 104 on the drum 34.

As shown in Figures 15A and 16A, the guide rails 224 curve around the right-hand transfer chain sprockets 208 and thereafter extend substantially tangentially with the dry drum 34. A second set of guide rails 26 are fixed to the transfer chain supports at this end of the transfer mechanism. As shown in Figure 4 and Figures 15A and 16A, these latter guide rails are spaced below and parallel the upper guide rails 224. The right-hand ends of the guide rails 226 merge substantially tangentially with the transverse flanges 134 of a pair of cylindrically curved angle guides 132, identical to the angle guides 132 previously described, which encircle the dry drum 34. Guides 132 serve to retain the core 100 in driving engagement with the cleats 104 on the latter drum 34 during rotation thereof.

As shown in Figures 15A and 16A, opposite ends of the core 100, upon being transported by the transfer mechanism 70 to the right-hand end of the latter become engaged between the spaced guide rails 224 and 226. These guide rails serve to guide the core out of the transfer cups 210 to a position below the transverse flanges 134 of the angle guides 132 encircling the drum 34. As previously mentioned and illustrated in Figures 15A and 16A, a set of cleats 104 on the drum 34 immediately follow each set of transfer cups as they pass about the right-hand transfer chain sprockets 208. These cleats engage opposite ends of the core 100, as the transfer cups supporting the same pass around the right-hand sprockets, and extract the core from the cups as shown most clearly in Figure 16A. The core and strip S, attached thereto, are then carried about the drum 34 as the latter rotates.

As shown most clearly in Figures 4 and 14, a pair of rollers 228 are journalled on the shafts 216 which support the end transfer chain sprockets 206 and 208. During transfer of a core from the wet drum 32 to the dry drum 34 by the transfer mechanism 70, the strip S attached to the core passes over and becomes trained around these rollers 228, the latter serving to support and guide the strip as it is withdrawn from the wet drum 32 and feeds onto the dry drum 34.

As the strip S passes around the drum 34, it becomes dried, as previously mentioned. Upon rotation of the core 100, attached to the leading edge of the strip, to the take-off mechanism 72, it is automatically extracted from the drum 34 and rotated to effect rewinding of the strip S on the core as the strip emerges in a dry state from the drum 34. This take-off mechanism 72 will now be described.

*Take-off mechanism*

The take-off mechanism 72, which is illustrated most clearly in Figures 1, 4 and 19 through 22, comprises a pair of mounting plates 300 fixed to the main frame 30 of the machine at opposite sides of the dry drum 34. Journalled at 302 on the supporting plates 300 for swinging about a common axis paralleling the axis of the drums 34 and spaced somewhat inwardly of the periphery of the latter as shown, are a pair of take-off arms 304. These take-off arms are spaced from the adjacent sides of the drum 34 so as to be swingable from their phantom line position of Figure 19, hereinafter referred to as the take-off position, to their solid line position of that figure, hereinafter referred to as the rewind position. The take-off arms are provided with counter weights 306 to facilitate this swinging thereof.

Journalled on the free ends of the arms 304 are a pair of take-off rollers 308 and 310, the latter being somewhat larger in diameter than the former. These take-off rollers 308 and 310 are located on the inner sides of the respective arms and are swingable, with their arms, in planes paralleling and spaced slightly from the adjacent sides of the drum 34. As shown most clearly in Figure 21, the rollers 310 each comprise an inner reduced cylindric portion 312 and an outer enlarged, generally conical flange portion 314.

When the take-off arms 304 are in their phantom line take-off position of Figure 19, the rollers 308 and 310 will be seen to have their axes located at opposite sides of the periphery of the drum 34. In this position of the arms 304, the rollers 308 are located radially inwardly of the periphery of the drum and are substantially tangent to the cylindric plane of the drum periphery. Rollers 310, on the other hand, are located outwardly of the drum periphery and the reduced cylindric portion 312 of the latter rollers project slightly across this cylindric plane of the drum periphery. Swinging of the take-off arms 304 to this take-off position is limited by adjustable stops 316 fixed to the supporting plates 300.

As may be seen most clearly in Figure 21, the inner end surfaces of the rollers 308 and 310 on each arm are located in a common plane paralleling the adjacent side of the drum 34 and passing between the latter side and the vertical flange 136 on the adjacent angle guide 132 which encircles the drum. It will be clear, therefore, that when the take-off arms 304 are in their phantom line take-off positions of Figure 19, the reduced cylindric portions 312 of the rollers 310 are located in the paths of the ends of the core 100, engaged with a set of cleats 104 on the drum. These core ends, as shown most clearly in Figure 21, project into the space between the sides of the drum 34 and the vertical flanges 136 of the angle guides 132.

Referring again to Figure 19, it will be seen, therefore, that the ends of a core 100, engaged with a set of cleats 104 on the drum, are carried into engagement with the reduced cylindric portions 312 of the rollers 310 upon rotation of the drum 34 to a position just slightly beyond that illustrated in Figure 19. Continued rotation of the drum 34 after this engagement of the ends of the core 100 with the cylindric portions 312 of the rollers 310, results in a counterclockwise torque being applied to the take-off arms 304. This torque tends to swing the arms 304 in a counterclockwise direction from their phantom line take-off position of Figure 19 to their solid line rewind position of that figure. This torque of course is created due to the fact that the thrust exerted on the rollers 310 by the ends of the core 100, as a result of the driving force exerted thereon by the cleats 104 of the drum, is directed to the left, as viewed in Figure 19, of the common pivotal axis 302 of the take-off arms.

Fixed at one end to intermediate portions of the take-off arms 304 and at the opposite ends to a pair of upstanding brackets 318 on the aforementioned platform 74, by the adjustable bolt and slot connections illustrated, are a pair of tension springs 320. The lower ends of the springs 320 are so located relative to the pivotal axis of the arms 304 that upon swinging the latter to their take-off position of Figure 19, the points of connection of the upper ends of the springs to the arms move just slightly to the right of a dead-center position with respect to the pivotal axis 302 of the arms.

When the arms 304 are in their phantom line, take-off position of Figure 19, therefore, the springs 320 serve to bias the arms 304 against the stops 316. Swinging of the arms through a small angle toward their rewind position, however, results in movement of the points of connection of the upper ends of the springs 320 to the arms 304, to the left, as viewed in Figure 19, of the dead-center position. The springs 320 then bias the arms 304 to their solid line rewind positions.

From the description thus far of the take-off mechanism 72, it will be clear, assuming the take-off arms to be in their phantom line take-off position of Figure 19, that rotation of opposite ends of the core 100 into engagement with the take-off rollers 310, results in initial swinging of the arms toward their rewind position against the action of the springs 320. Slight swinging of the arms in this direction, however, results in movement of the upper ends of the springs to the left of their dead-center position. Final swinging of the take-off arms to their solid line rewind position of Figure 19, therefore, is effected under the action of the springs 320.

During operation of the machine, a core 100 is carried around the dry drum 34 into engagement with the take-off rollers 310, which are then in their phantom line take-off position of Figure 19. The ends of the core 100 become lodged between the take-off rollers 308 and 310, as indicated in phantom lines in Figure 19, and the core is carried with the take-off arms 304 as they swing to their solid line rewind position in the manner described above.

Fixed to the supporting plates 300 and located in vertical planes spaced slightly inwardly of the end faces of the rollers 308 and 310, so as to overlie the opposite ends of the core 100 as the latter is carried with the arms 304 during swinging of the latter from their take-off position to their rewind position, are a pair of fixed guides 322. These guides are formed with lower, cylindrically concave edge surfaces 324 which prevent disengagement of the core 100 from its position between the take-off rollers 308 and 310.

Upon movement of the take-off arms 304 to their solid line rewind position of Figure 19, with a core 100 engaging between the take-off rollers 308 and 310 on the arms, opposite ends of the core become peripherally engaged with a pair of friction drive rollers 326 journalled on the side plates 300. As may be seen most clearly in Figure 19, the core is thereby cradled between the take-off rollers 308 and 310 and the drive rollers 326.

Referring to Figure 21, each of the drive rollers 326 mounts a sprocket 328 around which and a pair of sprockets 330, fixed to a shaft 332, are trained sprocket chains 334 (Figure 19). Shaft 332 is journalled at opposite ends in the supporting plates 300 and extends beyond the left-hand supporting plate 300, as viewed in Figure 21.

The extending end of shaft 332 is connected by a coupling 335 to a motor 336 which is supported on the left-hand plate 300. Motor 336 serves to drive the drive rollers 326 in a counterclockwise direction of rotation, as viewed in Figures 19 and 20. These friction rollers rotate the core 100 to effect rewinding of the strip S on the core as the strip emerges from the drum 34.

The speed of motor 336 is controlled by a speed control unit 338 (Figure 22) in a manner to maintain the tension in the strip between the core and drum 34 substantially constant. Unit 338 is fixed to the left-hand support plate 300, as shown most clearly in Figure 22, and comprises an angularly adjustable shaft 340 which, when turned, effects regulation of the speed of motor 336.

Speed control shaft 340 mounts a sprocket 342, around which and a larger sprocket 344, fixed to a shaft 346, is trained a sprocket chain 348. Shaft 346 is journalled in and extends between the support plates 300. Fixedly mounted on this shaft 346, intermediate the core guides 322, are a pair of curved arms 350 which may be seen most clearly in Figures 19 and 20.

Journalled at opposite ends on the free ends of the arms 350 is a roller 352 which is located to swing with the arms 350 in a direction generally toward and away from the core 100 when the latter is cradled between the rollers 308, 310 and 326. This roller 352 is engageable with the roll $R_2$ of the strip S, as the latter is rewound on the core 100 by the action of the friction drive rollers 326. As the diameter of the roll $R_2$ gradually increases, due to the winding of the strip thereon, the arms 350 are swung upwardly, as viewed in Figures 19 and 20, with resultant rotation of the shaft 346 in a clockwise direction. This rotation of the shaft 346, which is in a counterclockwise direction, as viewed in Figure 22, imparts counterclockwise turning to the speed control shaft 340.

This counterclockwise turning of the speed control shaft 340 has the effect of gradually reducing the speed of the drive motor 336 and hence the speed of the friction drive rollers 326. The speed reduction is such as to maintain the peripheral speed of the gradually enlarging supply roll $R_2$ substantially constant. The tension in the strip S between the roll and the drum 34 is, thereby, maintained substantially constant.

In order to accomplish swinging of the take-off arms 304 from their solid line rewind position of Figure 19 to their phantom line take-off position of that figure, each arm is connected by a link 354 to the end of the crank arm 356 which is journalled on a block 358, fixed to the frame 30 of the machine. In Figures 19 and 20, it will be seen that swinging of the cranks 356 in a counterclockwise direction from their solid line position in Figure 19 has the effect of swinging the take-off arms 304 to their take-off position.

Non-rotatably fixed to the crank arms 356, concentric with their pivotal axes, are sprockets 360 around which and a pair of sprockets 362 on a shaft 364 are trained sprocket chains 367. Shaft 364 is journalled in the supporting plates 300 and extends beyond the right-hand supporting plates as viewed in Figure 21. The extending end of the shaft 364 mounts a handle 366 by which the shaft 364 may be turned to swing the crank arms 356 in opposite directions to move the take-off arms 304 between their take-off and rewinding positions.

Referring to Figures 19 and 20, it will be seen that when a core 100 is cradled between the take-off rollers 308 and 310 and the drive rollers 326, it is vertically supported by the lower take-off rollers 310 and the drive rollers 326. It will be clear from a study of these figures that as the take-off arms are elevated from their solid line, rewind position of Figure 19, the core tends to remain nested between the take-off rollers 310 and the drive rollers 326, and is elevated slightly as the lower take-off rollers 310 swing upwardly with the take-off arms. It will further be apparent that swinging of the take-off arms 304 away from their rewind positions results in a gradual increase in the spacing between the lower take-off rollers 310 and the drive rollers 326, in which space the core 100 is nested.

Referring to Figure 20, it will be seen that eventually the spacing between these latter rollers becomes sufficient to accommodate downward passage of the core therethrough. The core and roll $R_2$ wound thereon are thereby released and dropped through an opening in the platform 74 into a receiver 368 supported below the platform 74. This receiver is open at its forward end to permit withdrawal of the roll $R_2$ therefrom.

In order to provide for automatic return of the take-off arms 304 to their take-off positions and release of one rewound roll $R_2$, in response to passage of a subsequent core 100 and strip attached thereto through the machine, each of the crank arms 356 has a rigid, radial arm 370 located approximate to the adjacent side of the drum 34. When the take-off arms 304 are in their solid line rewind position of Figure 19, the tips of these radial arms project slightly beyond the periphery of the drum 34 into the paths of the ends of the core 100, as shown.

Assuming the take-off arms 304 to be in their rewind position, therefore, rotation of a core 100 on the drum 34 eventually results in contact of the core ends with the radial arms 370. Continued rotation of the core with the drum after this contact causes swinging of the radial arms 370 from their solid line position of Figure 19 to the phantom line position of that figure, with resultant swinging of the take-off arms 304 from their rewind position to their take-off position. It will be observed that in the phantom line positions of the radial arms 370, the tips are located substantially flush with the peripheral surface of the drum 34. The arms, therefore, do not obstruct movement of the core 100 therepast into contact with the take-off rollers 308 and 310.

Solution delivery system

Figure 29 illustrates, in diagrammatic fashion, the system for supplying the several spray nozzles 40 with photographic processing solutions under pressure. A quantity of developing, fixing and salt spray solutions are contained in three large supply tanks 400, 402 and 404. Rinse water is received from a supply 406.

When setting up the machine for operation, solutions from the tanks 400, 402 and 404 are pumped to reserve tanks 408, 410 and 412, through conduits 414, 416 and 418, respectively, each including a pump 420 and a drain valve 422. Leading from the three solution reserve tanks 408, 410, 412 and the water supply 406 to a series of heaters 424 are fluid lines 426, 428, 430 and 434.

The heated solutions and water are discharged from the heaters through filters 436 to the respective spray nozzles 40 encircling the wet drum 32 through fluid lines 438, 440, 442 and 444. Temperature and pressure gauges 446 indicate the temperature and pressure of the fluids in the lines 438 through 444. These gauges are mounted on the frame of the machine intermediate the drums 32 and 34, as may be observed most clearly in Figure 1.

The solutions are pumped from the reserve tanks 408 through 412 to the heaters 424 by pumps 448 which are by-passed by lines 450 and bypass valves 452. Drain valves 454 are provided for draining and rinsing of the reserve tanks.

The operation of the solution supply system of Figure 29 is believed to be obvious so that no further description thereof is deemed necessary. Suffice it to say, during operation of the machine solutions are pumped from the reserve tanks to the spray nozzles 40 through the heaters 424 wherein they are heated to an elevated temperature to enable rapid developing, rinsing and fixing of the photographic material as it is fed to the machine.

Operation

The overall operation of the present photographic processing machine will now be described with reference primarily to Figures 23 through 28.

Referring to Figure 23, a supply roll $R_1$ of the strip S to be processed is placed in cradle 76 (Figure 4) of the loading mechanism 68. The core 100 is attached to the leading edge of the strip S, in the manner illustrated in Figure 8a. The core is then passed under the cradle roller 84 and inserted in the pockets 118 (Figure 4) of the brackets 114 of the loading mechanism.

When it is desired to feed the strip S into the machine, the core 100 is shifted to its pick-up position approximate to the wet drum 32 by turning the loading mechanism handle 130 (Figure 10), as previously described. The interlock means embodied in the loading mechanism prevent this shifting of the core 100 if a set of cleats 104 on the drum 32 are located in the path of the core, as was previously discussed.

Rotation of the drum 32 in the direction indicated by the arrow in Figure 23 eventually brings a set of cleats 104 on the drum into driving engagement with the opposite ends of the core 100. The core is thereby picked up by the cleats and carried about the drum 32 to the position of Figure 24. During this passage of the core about the drum 32, the strip unwinds from the supply roll $R_1$, the cradle roller 84 and the guide roller 138 guiding the strip onto the drum.

Upon reaching the position of Figure 24, the core 100 is extracted from the drum 32 and transferred to pickup relationship with the dry drum 34, the position of Figure 25, by the transfer mechanism 70. This operation of the transfer mechanism 70 has been previously described.

The core 100 is now engaged by a set of cleats 104 on the dry drum 34 and is carried about the latter drum into contact with the take-off rollers 308 and 310 of the take-off mechanism 72. If the take-off arms 304 of this latter mechanism are in their aforedescribed rewind position, the radial arms 370 will be located in the path of and engaged by the core during its rotation with the drum. These arms are swung by the core to move the take-off arms 304 to their take-off position of Figure 25.

Upon engagement of the core with the take-off rollers 308 and 310, the latter, and the take-off arms 304 are swung from the take-off positions of Figure 25 to the rewind positions of Figure 26. In these latter positions of the take-off arms 304, the core 100 is frictionally engaged with the rotatably driven drive rollers 326 and the strip S is rewound on the core. During this rewind operation, the roller 352 on the speed control arms 350 engage the rewind roll $R_2$ so as to maintain the tension in the strip between the roll $R_2$ and the drum 34 substantially constant, as previously described.

Figure 27:
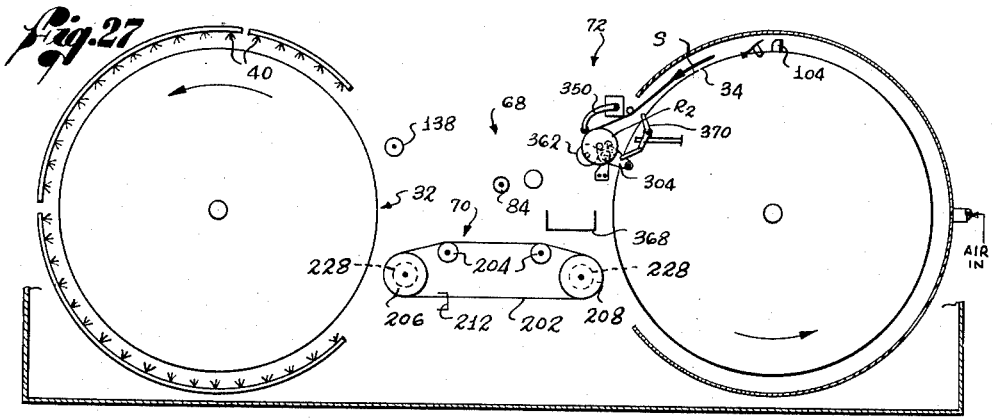
Figure 28:
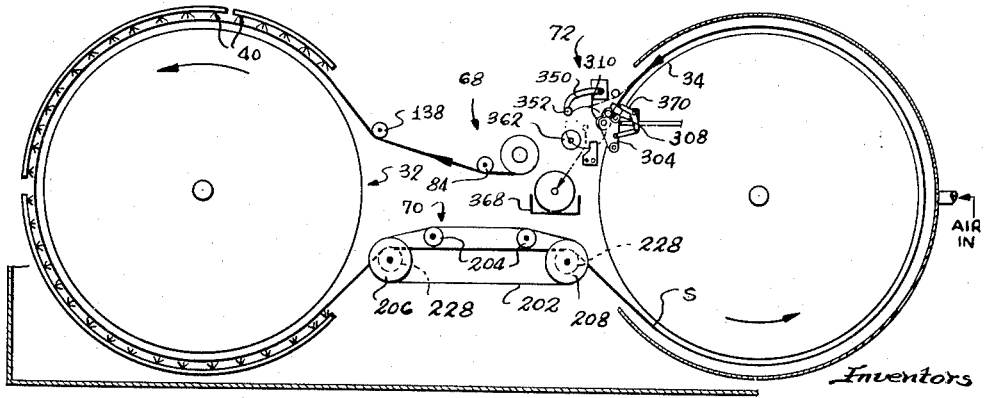

Eventually the entire strip S will be rewound on the roll $R_2$, as indicated in Figure 27. Upon feeding of a subsequent strip S through the machine, the core 100 on the latter strip will eventually move about the dry drum 34 and engage the radial arms 370 of the take-off mechanism 72, which arms are now in their extended position of Figure 28. This engagement of the subsequent core with the arms 370 again trips the latter to elevate the take-off arms 304 to their take-off position of Figure 28 in readiness for receiving the subsequent core.

During this elevation of the arms, the first rewound roll $R_2$ is released from the take-off mechanism 72, as previously described, and drops into the container 368.

The take-off arms 304 are now again moved to their rewind position to engage the subsequent core with the driving rollers 362 and effect rewinding of the subsequent strip S on the latter core. The first rewound roll $R_2$ will be removed from the container 368 immediately so as to accommodate receipt of the following rewound roll of a subsequent strip in the container.

While certain preferred embodiments of the invention have been described and illustrated, they are purely illustrative in nature, it being apparent that numerous modifications in design and arrangement of parts are possible within the scope of the following claims:

We claim:

1. In strip handling apparatus of the character described, a core to be attached to one end of a strip of material to be handled, core transport means including movable core engaging means movable along a defined path, said core engaging means being drivingly engageable with said core to move the latter along said path, movably support means for releasably supporting said core and positioning the latter in the path of movement of said core engaging means, said core support means being movable between a retracted position wherein a core supported thereby is located out of the path of said core engaging means and an extended position wherein the core is located in said path, means for manually moving said core support means between said positions, and interlock means to prevent movement of said core support means to said extended position when said core engaging means are moving past said core support means, said core being releasable from said core support means in the direction of movement of said core engaging past said core support means, whereby a core supported on said latter means is picked up by and carried along with said core engaging means as the latter move past said core support means.

2. The subject matter of claim 1 wherein said interlock means comprise movable stop means for limiting movement of said core support means toward said extended position, said stop means being movable to one position to prevent movement of said core support means to said extended position and to another position wherein movement of said core support means to said extended position is permitted, and means for moving said stop means in synchronism with said core engaging means.

3. The subject matter of claim 2 wherein said stop means further comprises a movable cam means which is moved in synchronism with said core support means, a movable stop member on said core support means engageable with said cam means, means for latching said stop member against movement relative to said core support means to condition said interlock means for limiting movement of said core support means toward said extended position, and means responsive to movement of said core support means to said extended position for releasing said latch means whereby to permit movement of said stop member relative to said core support means and avoid movement of said core support means away from said extended position by the action of said cam means.

4. In strip handling apparatus of the character described, a core to be attached to one end of a strip of material to be handled, core transport means including movable core engaging means movable along a defined path, said core engaging means being drivingly engageable with said core to move the latter along said path, movable support means for releasably supporting said core, said core support means being movable between a retracted position wherein a core supported thereon is located out of the path of movement of said core engaging means and an extended position wherein the core is disposed in said path of movement, said core being releasable from said core support means in the direction of movement of said core engaging means past said core support means, whereby a core supported on said latter means is picked up by and carried along with said core engaging means as the latter move past said core support means, and means for moving said core support means between said positions including a rotatable shaft turnable in opposite directions to move said core support means to said positions, means for turning said shaft, a radial arm journalled on said shaft, latch means for releasably latching said arm against turning on the shaft whereby the arm swings with the shaft, rotary eccentric cam means located in the path of swinging of the arm with the shaft when the latter is turned in one direction to move said core support means toward said extended position, said cam means when in one angular position limiting swinging of the arm with the shaft to an intermediate position wherein a core supported on said core support means clears said path of movement of the core engaging means, said cam means when in another angular position permitting swinging of said arm with said shaft beyond said intermediate position to permit moving of said core support means to said extended position, means for turning said cam means in synchronism with movement of said core engaging means in such manner as to prevent movement of said core support means to said extended position when said core engaging means are moving past said core support means, and means for releasing said latch means to permit turning of said arm on said shaft in response to movement of said core support means to said extended position.

5. In strip handling apparatus of the character described, an elongate core to be attached to one end of a strip of material to be handled with the core extending transverse to the length of and beyond opposite side edges of said strip, core transport means including a pair of movable core engaging members movable along a defined path, said core engaging members being spaced transversely of said path for driving engagement with said core adjacent opposite ends of the latter to move the core along said path, and core loading means for loading a core on said core transport means, said loading means including a pair of movable arms for releasably supporting opposite ends of the core, said arms being movable between retracted positions wherein a core supported on the arms is located out of the path of movement of said core engaging members and extended positions wherein the end portions of a core supported on said arms are located in the path of movement of said members, and means for moving said arms between said positions, said core being releasable from said arms in the direction in which said members move past the arms when the latter are in said extended positions, whereby a core on the arms is picked up by and carried along with said members during movement of the latter past said arms.

6. The subject matter of claim 5 wherein said core transport means further comprises a rotary drum, and said core engaging members comprise at least a pair of cleats on the drum, said cleats being aligned axially of and projecting beyond the periphery of said drum.

7. In strip handling apparatus of the character described, a core to be attached to one end of a strip of material to be handled, spaced first and second core transport means each including movable first core engaging means movable along first defined paths and releasably drivingly engageable with said core to move the latter along the respective path, and core transfer mechanism for picking off said core from one of said transport means and feeding the core to the other transport means, including movable second core engaging means movable along a second defined path intersecting each of said first paths and drivingly engageable with said core to move the latter along said second path, means for moving said first and second core engaging means in synchronism in such manner that said second core engaging means drivingly engages a core carried by said core engaging means on said one core transport means during movement of the core along said first path of the latter core engaging means past the adjacent point of path intersection, and said first core engaging means on said other core transport means drivingly engages a core carried by said second core engaging means during movement of the core along said second path past the adjacent point of path intersection, and guide means adjacent said points of intersection for guiding a core for movement by said second core engaging means from said first path of the core engaging means on said one core transport means to said second path whereby the core is moved along said second path by said second core engaging means, and for guiding said core for movement by the core engaging means on said other core transport means from said second path to said first path of the latter core engaging means.

8. In apparatus for handling a long strip having a core attached to one end, the combination of a core transport means including movable core engaging means for moving the core along a defined path, take-off mechanism including movable core receiving means movable to a first position in said path for rotatably receiving a core carried along said path by said core engaging means, said core receiving means having a force exerted thereon by said core engaging means through said core when the latter is seated in said core receiving means, means responsive to said force for moving said core receiving means and core received therein to a second position out of said path, and means responsive to movement of said core receiving means to said second position for rotating said core received thereon to wind a strip attached to the core on the latter.

9. The subject matter of claim 8 wherein said core transport means comprises a rotary drum, and said core engaging means comprise radially projecting cleat means on the drum.

10. The subject matter of claim 8 wherein said take-off mechanism further comprises means for moving said core receiving means between said positions including trip means movable into said path in response to movement of said core receiving means to said second position, said trip means being engageable by a subsequent core moved along said path by said core engaging means and being movable by said subsequent core to shift said core receiving means to said first position for receiving said subsequent core, and means for releasing the first-mentioned core from said core receiving means in response to said shifting of the latter means to said first position by said subsequent core.

11. In strip handling apparatus of the character described, a core to be attached to one end of a strip of material being handled with the core extending transversely of and beyond opposite side edges of the strip, core transport means including a pair of movable cleats movable along a defined path and spaced transversely of said path for engaging said core adjacent its opposite ends to move the core along said path, take-off mechanism located along said path for removing a core from said transport means and rotating the core to wind a strip attached to the core on the latter, said take-off mechanism comprising a pair of pivotal arms swingable about a common axis extending transversely of said path, a pair of spaced rollers journalled at one end of each arm for rotation about axes substantially paralleling said first-mentioned axis, said arms being swingable between a first position wherein said rollers on each arm are disposed on opposite sides of and substantially tangent to said path, the rollers on the pair of arms being spaced to engage opposite ends of said core as the latter is moved along said path by said cleats and said first-mentioned axis being so located that said engagement of said core with said rollers produces a torque on said arms tending to swing the latter to a second position wherein said rollers are spaced from said path, the ends of said core seating between the rollers on each arm and being carried with the arms as the latter swing to said second position, guide means overlying said rollers to retain said core in position between said rollers during swinging of the arms to said second position, and friction drive roller means peripherally engaged by said core upon swinging of said arms to said second position for rotating the core to wind a strip attached to the core on the latter.

12. The subject matter of claim 11 wherein said take-off mechanism further includes means for moving said arms between said pivotal positions including trip means movable into said path in response to swinging of said arms to said second position, said trip means being engageable by a subsequent core moved along said path by said cleats and being pivotable by said subsequent core to move said arms to said first position to position said rollers thereon for receiving said subsequent core, said drive roller means being horizontally spaced from said rollers on the arms when the latter are in said second position, said first-mentioned core nesting between said latter rollers and drive rollers in the latter positions of the arms and being released to drop clear of said take-off mechanism in response to said movement of said arms to said first position by said subsequent core.

13. The subject matter of claim 8 including means engageable with the roll of said strip wound on said core for maintaining the peripheral speed of said roll substantially constant.

14. In strip handling apparatus of the character described, a core to be attached to one end of a strip to be handled, spaced first and second rotary core transport drums each including radially projecting cleat means movable along first circular paths during rotation of their respective drums and releasably drivingly engageable with said core to move the latter along the respective paths, and core transfer mechanism for picking off said core from one of said drums and feeding the core to the other drum, including flexible drive chains and core-end-receiving cups on the drive chains which are movable along a second defined path tangentially intersecting each of said first paths and drivingly engageable with the ends of said core to move the latter along said second path, means for moving said drums and drive chains in synchronism in such manner that said cups pick off a core from said first drum during movement of the core past the adjacent point of path intersection, and said cleat means on said other drum pick off the core from said drive chains during movement of the core along said second path past the adjacent point of path intersection.

15. In an apparatus for handling a long strip having a core attached to one end, the combination of a first rotary core transport drum having radially projecting cleat means drivingly engageable with said core for feeding the latter along a first circular path, core loading mechanism including movable core support means movable between a first position wherein a core supported thereon is located out of said path and a second position wherein said core is positioned in said path to be engaged by and carried along with said cleat means, means for moving said core support means between said positions, a second rotary core transport drum having radially projecting cleat means engageable with said core for feeding the latter along a second circular path, and transfer mechanism comprising core engaging members moved in synchronism with the cleats on said drums for picking off said core from the cleats of the first drum and transferring the core to the cleats of the second drum.

16. A strip handling machine of the character described, comprising a core to be attached to one end of a strip of material to be handled, first core transport means including movable core engaging means drivingly engageable with said core for feeding the latter along a first defined path, core loading mechanism including movable core support means movable between a first position wherein a core supported thereon is located out of said path and a second position wherein said core is positioned in said path to be engaged by and carried along with said core engaging means, means for moving said core support means between said positions, second core transport means including core engaging means engageable with said core for feeding the latter along a second defined path, interlock means for preventing movement of said core support means to said second position when said core engaging means on said first core transport means are moving past said loading mechanism, and transfer means for transferring said core when the latter is in a given position along said first path from said first transport means to a position in the path of said core engaging means on said second transport means whereby said core is engaged by and carried along said second path with said core engaging means on the second core transport means.

17. A strip handling machine of the character described, comprising a core to be attached to one end of a strip of material to be handled, first core transport means including movable core engaging means drivingly engageable with said core for feeding the latter along a first defined path, core loading mechanism including movable core support means movable between a first position wherein a core supported thereon is located out of said path and a second position wherein said core is positioned in said path to be engaged by and carried along with said core engaging means, means for moving said core support means between said positions, second core transport means including core engaging means engageable with said core for feeding the latter along a second defined path, transfer means for transferring said core when the latter is in a given position along said first path from said first transport means to a position in the path of said core engaging means on said second transport means whereby said core is engaged by and carried along said second path with said core engaging means on the second core transport means, and a take-off mechanism located along said second path for extracting the core from the second transport means and rotating the core to wind the strip on the core.

18. The subject matter of claim 17 wherein said take-off mechanism also comprises means responsive to feeding of a second core through the apparatus for resetting the take-off mechanism to extract said second core and releasing the first-mentioned core.

19. In an apparatus for handling a long strip of material having a rigid core attached to one end, the combination of a core transport including projecting cleat means for engaging the core and moving the latter along a defined path and means for supporting the strip trailing behind the core for movement along said path; and loading means for feeding a core to the transport as it moves including a manually movable core support drivably disconnected from said transport so as to be independently movable between a retracted position away from the transport and an extended position wherein a core on the support is located in the path of said cleat means, said support including means which releasably hold the core in such a way that the latter is picked off from the support by said cleat means as the latter move past the support, and a handle on the support by which the latter may be selectively moved between said positions during operation of the transport.

20. The subject matter of claim 19 including interlock means synchronized with the movement of the transport to limit movement of said support toward its extended position under certain conditions.

21. The subject matter of claim 19 including means close to said support for rotatably holding a roll of said strip material, and means for guiding the strip for movement from the roll to said transport following engagement of its core with the transport.

22. The subject matter of claim 19 wherein said transport comprises a rotary drum and said strip supporting means on the transport comprises an outer cylindrical wall of the drum.

23. In an apparatus for handling a long strip of material having a rigid core attached to one end, the combination of a frame, a pair of rotary drums on the frame, projecting cleat means on each drum for releasably engaging the core and moving the latter with the respective drum; and a movable endless core transfer means for transferring the core from one drum to the other including core engaging means for releasably holding the core and moving the latter along a defined path which merges tangentially with the path of the cleat means on each drum with the core engaging means moving in the same direction as the adjacent cleat means; means for driving said drums and transfer means in synchronism so that said core engaging means picks off the core from one drum and delivers it to a position whereat it is picked up by the cleat means on the other drum; and guide rollers on the frame for guiding the strip attached to the core for movement from said one drum to the transfer means and from the latter means to the other drum.

24. The subject matter of claim 23 wherein said drums are mounted on said frame for rotation on parallel axes, said transfer means being mounted on the frame between the drums, the latter being driven in opposite directions of rotation.

25. In an apparatus for handling a long strip of material having a rigid core attached to one end, the combination of movable transport means for feeding the core and strip along a defined path including cleat means engageable with the core; and a take-off mechanism located along said path including means engaged by the core as it moves along said path for removing the core from the transport to a given position spaced from the latter, and means for rotating the core when in said given position to wind the strip on the core.

References Cited in the file of this patent

UNITED STATES PATENTS

| | | |
|---|---|---|
| 1,532,753 | Jones et al. | Apr. 7, 1925 |
| 2,385,692 | Corbin et al. | Sept. 25, 1945 |
| 2,848,175 | Stephens et al. | Aug. 19, 1958 |